(12) United States Patent
Marks et al.

(10) Patent No.: US 11,418,723 B1
(45) Date of Patent: Aug. 16, 2022

(54) INCREASING DYNAMIC RANGE OF A VIRTUAL PRODUCTION DISPLAY

(71) Applicant: Unity Technologies SF, San Francisco, CA (US)

(72) Inventors: Joseph W. Marks, Boston, MA (US); Luca Fascione, Wellington (NZ); Kimball D. Thurston, III, Wellington (NZ); Millie Maier, Wellington (NZ); Kenneth Gimpelson, Wellington (NZ); Dejan Momcilovic, Wellington (NZ); Keith F. Miller, Wellington (NZ); Peter M. Hillman, Wellington (NZ); Jonathan S. Swartz, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/538,234

(22) Filed: Nov. 30, 2021

Related U.S. Application Data

(60) Provisional application No. 63/283,927, filed on Nov. 29, 2021.

(51) Int. Cl.
  *G06T 5/00* (2006.01)
  *G06T 7/174* (2017.01)
  (Continued)

(52) U.S. Cl.
  CPC ........... *H04N 5/2355* (2013.01); *G06T 5/007* (2013.01); *G06T 7/174* (2017.01); *G09G 5/10* (2013.01);
  (Continued)

(58) Field of Classification Search
  None
  See application file for complete search history.

(56) References Cited

U.S. PATENT DOCUMENTS

| 4,757,470 A | | 7/1988 | Bruce et al. |
| 5,977,946 A | * | 11/1999 | Mizobata ............... G09G 5/395 |
| | | | 348/576 |

(Continued)

FOREIGN PATENT DOCUMENTS

| JP | 2004-139206 A | * | 10/2002 | ............. G06F 3/033 |

OTHER PUBLICATIONS

Borer, Tim, and Andrew Cotton. "A display-independent high dynamic range television system." SMPTE Motion Imaging Journal 125.4 (2016): 50-56.

(Continued)

*Primary Examiner* — Yanna Wu
(74) *Attorney, Agent, or Firm* — Perkins Coie LLP

(57) ABSTRACT

Disclosed here are various techniques to increase dynamic range of an image recorded from a display. A processor performing preprocessing splits an input image containing both bright and dark regions into two images, image A containing bright regions, and image B containing dark regions. The display presents image A and image B in alternating fashion. Camera is synchronized with the display to record image A and image B independently. In postprocessing, a processor obtains the recorded images A and B. The processor increases the pixel value of the recorded image A to obtain image A with increased pixel value. Finally, the processor increases pixel value of the image recorded from the display by combining the first recorded image with increased pixel value and the second recorded image.

21 Claims, 31 Drawing Sheets

(51) Int. Cl.
*H04N 5/235* (2006.01)
*G09G 5/10* (2006.01)
*H04N 5/232* (2006.01)

(52) U.S. Cl.
CPC . *H04N 5/23232* (2013.01); *G09G 2320/0626* (2013.01)

(56) References Cited

U.S. PATENT DOCUMENTS

| | | | |
|---|---|---|---|
| 6,021,417 | A | 2/2000 | Massarsky |
| 6,031,573 | A | 2/2000 | MacCormack et al. |
| 6,556,212 | B1 | 4/2003 | Griffin |
| 8,253,649 | B2 | 8/2012 | Imai et al. |
| 8,508,614 | B2 | 8/2013 | Segal |
| 8,730,354 | B2 | 5/2014 | Stafford et al. |
| 8,867,817 | B1 | 10/2014 | Cooper et al. |
| 9,013,570 | B2 | 4/2015 | Matsunobu et al. |
| 9,639,987 | B2 | 5/2017 | Fahey |
| 9,672,603 | B2 | 6/2017 | Koike et al. |
| 9,811,892 | B1 | 11/2017 | Silverstein et al. |
| 9,832,441 | B2 | 11/2017 | Osman |
| 10,062,152 | B2 | 8/2018 | Choudhury et al. |
| 10,165,194 | B1 | 12/2018 | Baldwin |
| 10,223,776 | B2 | 3/2019 | McLaughlin et al. |
| 10,775,319 | B2 | 9/2020 | Niikura et al. |
| 10,832,636 | B2 | 11/2020 | Eto et al. |
| 10,863,201 | B2 | 12/2020 | Mertens et al. |
| 10,930,223 | B2 | 2/2021 | Pytlarz et al. |
| 10,956,766 | B2 | 3/2021 | Ramaswamy et al. |
| 11,227,443 | B2 | 1/2022 | Hooper et al. |
| 2004/0101201 | A1 | 5/2004 | Sharma et al. |
| 2007/0110290 | A1 | 5/2007 | Chang et al. |
| 2007/0188623 | A1 | 8/2007 | Yamashita et al. |
| 2008/0068392 | A1 | 3/2008 | Ichinose et al. |
| 2008/0240240 | A1 | 10/2008 | Kodama |
| 2009/0028453 | A1 | 1/2009 | Collomosse et al. |
| 2010/0026731 | A1 | 2/2010 | Konuma |
| 2010/0045611 | A1 | 2/2010 | Nelson et al. |
| 2010/0253850 | A1 | 10/2010 | Cooper et al. |
| 2011/0176024 | A1* | 7/2011 | Kwon ............. H04N 5/235 348/222.1 |
| 2011/0176028 | A1 | 7/2011 | Toyoda |
| 2012/0114234 | A1 | 5/2012 | Fard |
| 2012/0275691 | A1 | 11/2012 | Hosokawa et al. |
| 2013/0194492 | A1 | 8/2013 | Kutcka et al. |
| 2015/0049215 | A1 | 2/2015 | Kuang et al. |
| 2015/0213766 | A1 | 7/2015 | Sugimoto |
| 2016/0026253 | A1 | 1/2016 | Bradski et al. |
| 2016/0035317 | A1 | 2/2016 | Imai et al. |
| 2016/0344990 | A1 | 11/2016 | Kozuka et al. |
| 2017/0016210 | A1 | 1/2017 | Kowata et al. |
| 2017/0070681 | A1 | 3/2017 | Nattress |
| 2017/0162107 | A1 | 6/2017 | Ninan et al. |
| 2017/0295300 | A1 | 10/2017 | Esashi et al. |
| 2017/0330529 | A1 | 11/2017 | Van Mourik et al. |
| 2018/0247396 | A1 | 8/2018 | Pouli et al. |
| 2019/0007593 | A1 | 1/2019 | Watanabe |
| 2019/0130542 | A1 | 5/2019 | Tichelaar et al. |
| 2019/0285468 | A1 | 9/2019 | Berkovich et al. |
| 2019/0362151 | A1 | 11/2019 | Stokking et al. |
| 2020/0098096 | A1 | 3/2020 | Moloney |
| 2020/0105221 | A1 | 4/2020 | Marcu et al. |
| 2020/0311428 | A1 | 10/2020 | Rom |
| 2020/0357439 | A1 | 11/2020 | Akiyoshi et al. |
| 2020/0389576 | A1 | 12/2020 | Newman |
| 2020/0412915 | A1 | 12/2020 | Suzuki |
| 2021/0065287 | A1 | 3/2021 | Sights et al. |
| 2021/0235003 | A1 | 7/2021 | Hu et al. |
| 2021/0287348 | A1 | 9/2021 | Partin et al. |

OTHER PUBLICATIONS

Liu, Y-L, et al., "Single-Image HDR Reconstruction by Learning to Reverse the Camera Pipeline", Proceedings of the IEEE/CVF Conference on Computer Vision and Pattern Recognition (CVPR), 2020, pp. 1651-1660.

* cited by examiner 12,418,723 B1

INCREASING DYNAMIC RANGE OF A VIRTUAL PRODUCTION DISPLAY

CROSS-REFERENCE TO RELATED APPLICATIONS

This application claims priority to the U.S. provisional patent application Ser. No. 63/283,927 filed Nov. 29, 2021 which is incorporated herein by reference in its entirety.

BACKGROUND

Virtual production is a technique of recording a movie on a soundstage with a specially constructed display, e.g., an LED wall, and ceiling that together form a virtual production set. The virtual production set envelops the actors in a virtual display—like a giant TV screen—of any conceivable environment that is displayed and lights the actors with the same lighting profile that is illuminating the virtual objects seen on screen. The background could be the dunes of an extraterrestrial planet or the interior of a lamplit Parisian restaurant. In the virtual production set, actors are lit with the correct natural lighting appropriate to the virtual world around them, in the studio and on camera, because the screen, in addition to providing the imagery, also provides the illumination.

A virtual production display is limited by the pixel value that it can display. Creating high-fidelity movies requires recording images having a high dynamic range of pixel value.

BRIEF DESCRIPTION OF THE DRAWINGS

Detailed descriptions of implementations of the present invention will be described and explained through the use of the accompanying drawings.

Figure 1A:
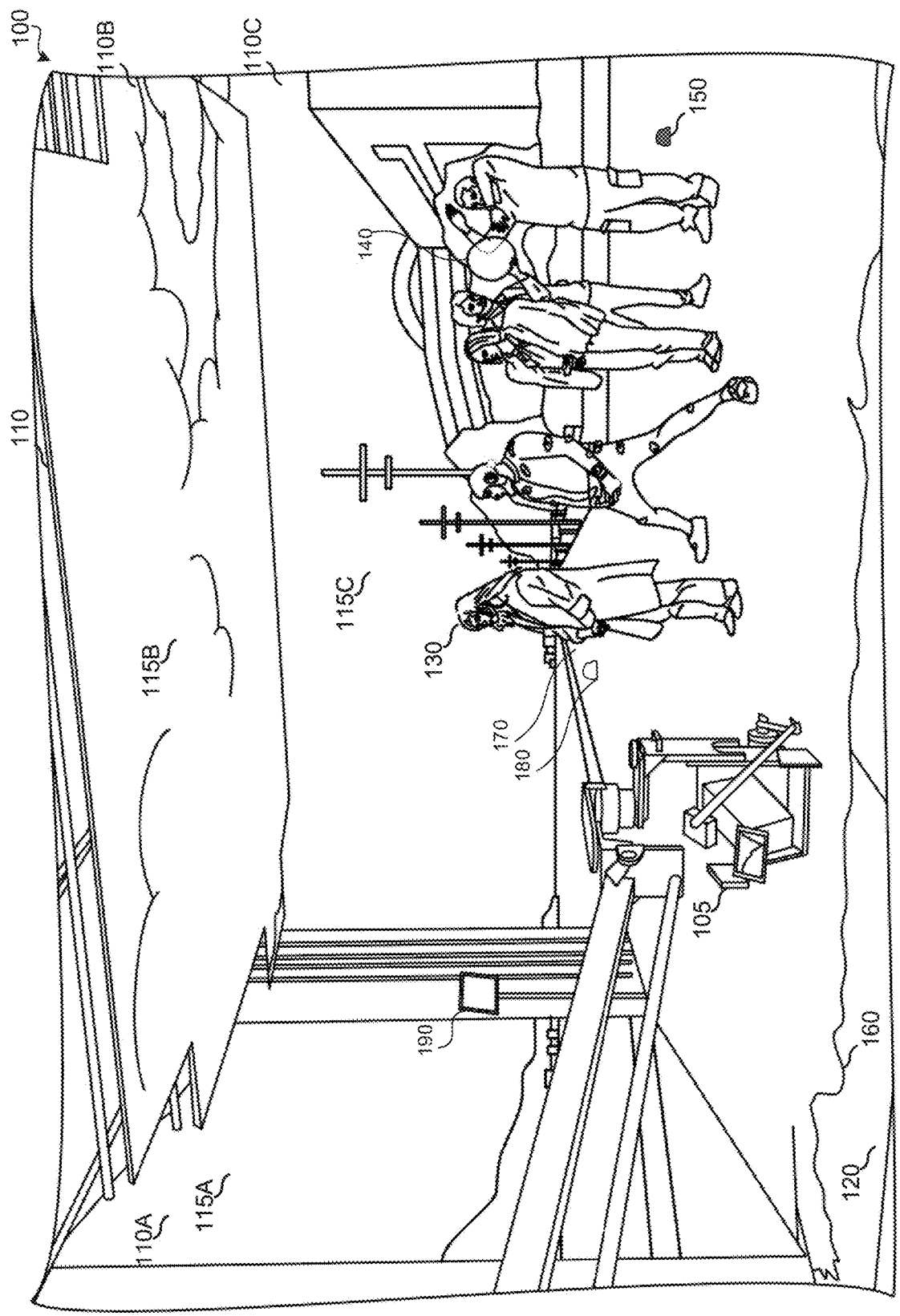
FIGS. 1A-1B show a virtual production set.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here are various techniques to increase dynamic range of an image recorded from a display. Increasing dynamic range can include making the image recorded from the display darker, brighter, and/or more colorful. In one technique, a processor performing preprocessing splits an input image containing both bright and dark regions into two images, image A containing bright regions, and image B containing dark regions. The virtual production display presents image A and image B in alternating fashion. Camera A and camera B are synchronized with the display so that camera A records image A, and camera B records image B. In postprocessing, a processor obtains the recorded images A and B. The processor increases the pixel value of the recorded image A to obtain image A with increased pixel value. To increase the pixel value of the recorded image A, the processor can apply a pixel value increasing function such as an inverse of a hybrid log-gamma function, an inverse of a log encoding function, an inverse of a perceptual quantizer function, and/or a calibration function. Finally, the processor increases pixel value of the image recorded from the display by combining the first recorded image with increased pixel value and the second recorded image.

In another technique, a processor performing preprocessing obtains an input image containing both bright and dark regions. The processor performing preprocessing obtains a first pixel value of the virtual production display and a second pixel value of the virtual production display, where the first pixel value and the second pixel value indicate a dynamic range of the display. The processor determines a desired pixel value range that exceeds the second pixel value of the virtual production display. The desired pixel value range can correspond to a pixel value that the camera can record and that exceeds the second pixel value of the virtual production display. In another example, the desired pixel value range can correspond to a pixel value that an observer of the image can perceive and that exceeds the second pixel value of the virtual production display. In a third example, the desired pixel value range corresponds to a second pixel value that can be recorded in the image. The processor can obtain a threshold between the first pixel value of the virtual production display and the second pixel value of the virtual production display. The processor can obtain a function mapping the desired pixel value range to a range between the threshold and the second pixel value of the virtual production display. The processor can apply the first function to the input image prior to displaying the input image on the virtual production display. Upon applying the function, the virtual production display can present the image. Upon recording the presented image, a processor performing postprocessing can determine a region within the recorded image having a pixel value within the range between the threshold and the second pixel value of the virtual production display. The processor can increase dynamic range of the image recorded from the virtual production display by applying an inverse of the function to the pixel value of the region, where the inverse of the first function increases the pixel value of the region.

In a third technique, a processor performing postprocessing obtains an input image containing both bright and dark regions. The processor can obtain a threshold between a first pixel value of the virtual production display and a second pixel value of the virtual production display. Upon detecting a region of the input image having an original pixel value above the threshold, the processor can modify the region according to predetermined steps producing a pattern unlikely to occur within the input image, where the pattern corresponds to a difference between the original pixel value and the threshold. The processor can replace the region of the input image with the pattern to obtain a modified image. The virtual production display can present the modified image. A processor performing postprocessing can detect the pattern within the modified image displayed on the virtual production display. The processor can calculate the original pixel value of the region by reversing the predetermined steps. The processor can replace the pattern in the modified image with the original pixel value.

In a fourth technique, a processor performing postprocessing obtains an input image containing both bright and dark regions. The processor can obtain a threshold between a first pixel value of the virtual production display and a second pixel value of the virtual production display. Upon detecting a region of the input image having an original pixel value above the threshold, the processor can create a data structure including a location of the region in the input image and an original pixel value of the region. The data structure occupies less memory than the input image. The virtual production display can present the input image including the region of the image having the original pixel value above the threshold. The processor can send the data structure to a processor associated with the camera recording the presented image. The processor associated with the camera can perform postprocessing. Once the camera records the presented image, the processor performing postprocessing can obtain the data structure in the recorded image, and increase dynamic range of the recorded image by modifying the recorded image based on the representation of the input image to obtain an output image. The pixel value of the output image can closely approximate, or exactly match, the pixel value of the input image.

A processor can calibrate the camera. The processor can present an input image on the display to obtain a presented image. The camera can record the presented image to obtain a recorded image, where the camera is arbitrarily positioned relative to the display. The processor can obtain the input image via a channel different from the display. The processor can obtain an indication of a display region associated with the display. The processor can determine an input image region corresponding to the display region, and a recorded image region corresponding to the display region. The processor can obtain a first pixel value associated with the input image region and a second pixel value associated with the recorded image region, where a pixel value is a set of numbers defining hue, saturation and intensity. The processor can determine a mapping between the first pixel value and the second pixel value, where applying the mapping to the second pixel value substantially produces the first pixel value. The processor can store an identifier associated with the recorded image region and the mapping.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Figure 1B:
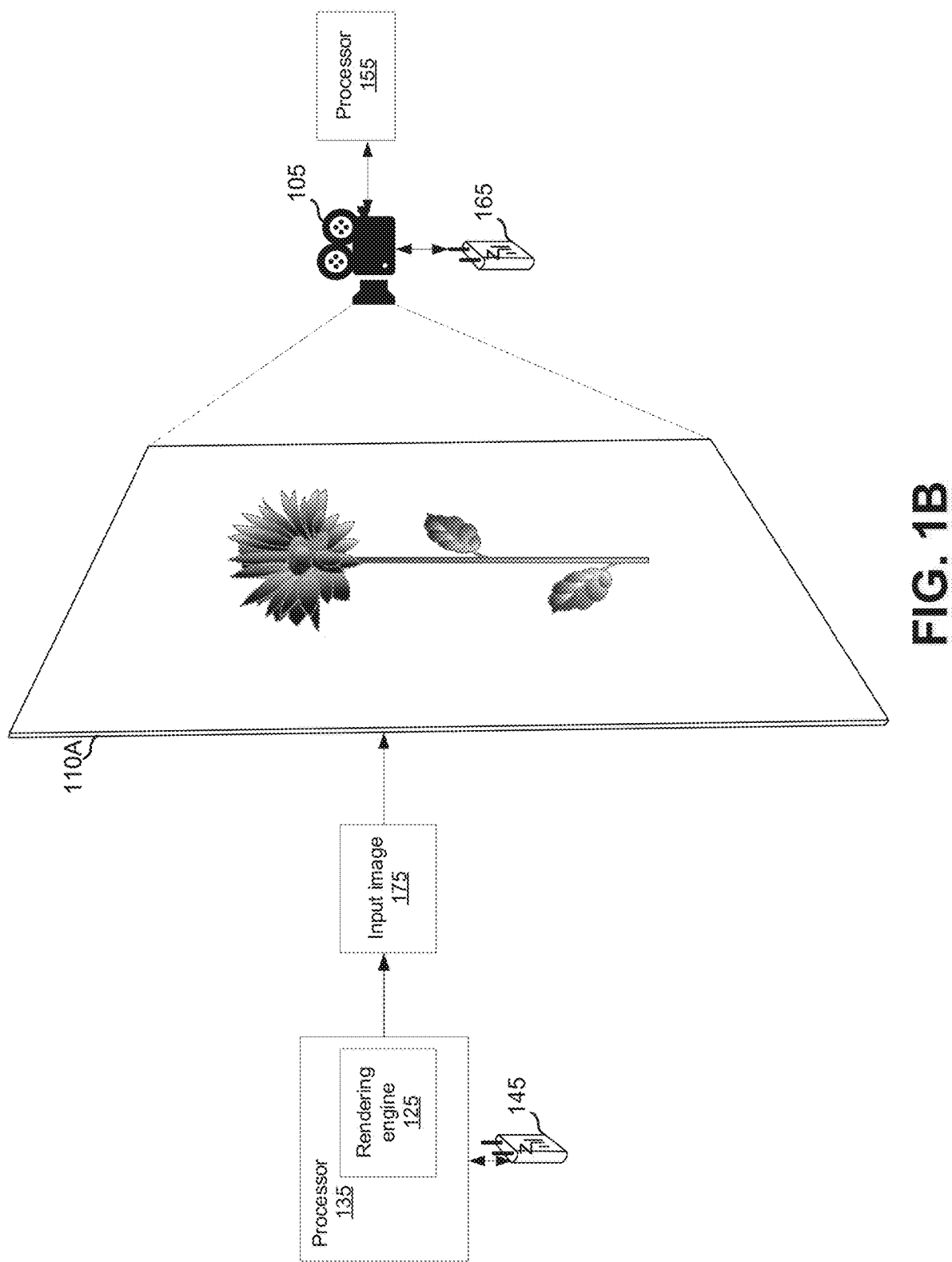

I. Increasing Dynamic Range of a Virtual Production Display Using Image Splitting FIGS. 1A-1B show a virtual production set. The virtual production set 100 includes a virtual production display ("display") 110 which can surround a stage 120. The display 110 can include multiple screens 110A, 110B, 110C. One or more of the screens 110A, 110B, 110C can be curved. The size of each screen 110A, 110B, 110C can correspond to a size of a wall and exceed 6 feet in height and 3 feet in width. The screen can use various display technologies such as LCD, LED, OLED, a projector, etc.

The stage 120 is sufficiently large to include multiple actors 130 and props 140, 150, 160. The stage 120 can seamlessly integrate with the screens 110A, 110B, 110C presenting images 115A, 115B, 115C, respectively. For example, the stage 120 can include props, such as rocks 150 and sand 160, that mimic the appearance of rocks 170 and sand 180 that appear on the display 110.

The display 110 illuminates the stage 120, actors 130, and props 140, 150, 160. Thus, the lighting of the environment and the lighting of the actors 130 and props 140, 150, 160 matches. In particular, highly reflective surfaces, such as metallic surfaces, properly reflect the environment. In addition to the display 110 illumination, additional lights 190 can illuminate the stage 120.

The display 110 needs to update the images 115A, 115B, 115C to reflect events on the stage 120 such as motion of the actors 130, parallax to correctly create a sense of depth, interaction between the actors 130 and the images 115A-C, etc. In other words, the display 110 needs to render in real time. A rendering engine 125, such as Unreal Engine or Gazebo, running on a processor 135 can render the images 115A-C in real time in response to events on the stage 120. The rendering engine 125 can communicate with a camera 105 using a wired or a wireless network.

The camera 105 can record the stage 120 including images presented on the display 110, actors 130, and props 140, 150, 160. The camera 105 and the processor 135 can each be coupled to a wireless transceiver 165, 145, respectively, through which the rendering engine 125 can track the camera movement, and through which the processor and the camera can communicate.

Figure 2:
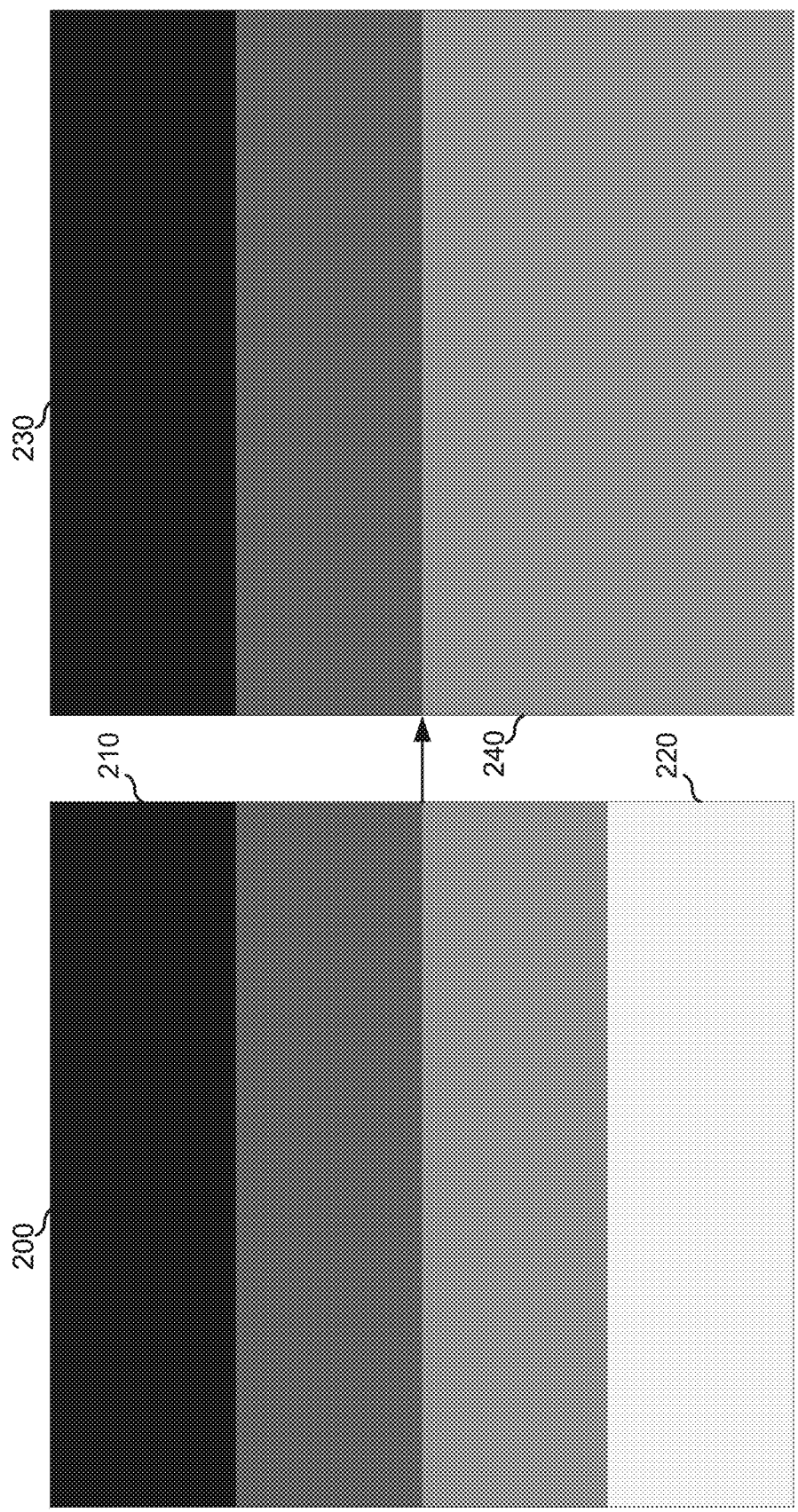
FIG. 2 shows a high-contrast image to be shown on the display.

FIG. 2 shows a high-contrast image 200 to be shown on the display 110. The display 110 can have a limited range of luminance. Consequently, the display 110 cannot faithfully display the high dynamic range of the image 200. The high dynamic range can include the low luminance regions 210 and the high luminance regions 220. To display the image 200, the display 110 can clip the high luminance regions 220, and display the image 230. In image 230, the high luminance region 220 has been clipped to match a lower luminance region 240.

Going back to FIGS. 1A-1B, as described in this application, the processor 135 can apply various techniques to increase dynamic range of an input image 175, prior to presenting the input image on the display 110. After the processor 135 applies the technique, a processor 155 associated with the camera 105 in FIG. 1B can apply the inverse of the technique to retrieve the original luminance of the images 115A-C. In other words, the processor 135 and the processor 155 need to agree which technique to apply to the images 115A-C.

To achieve the agreement, in one implementation, the processors 135, 155 can exchange information about the technique to apply using a wireless transceiver 145, 165 associated with each processor. In another implementation, the processors 135, 155 can receive an input from a user indicating the technique to be used. The user can specify the input through a user interface such as a graphical user interface, an audio user interface, or a hardware user interface. The hardware user interface can include a dial or a switch. In a third implementation, a region of the images 115A-C can include a signal to indicate to the processor 135 the technique being used. The signal can be encoded using a watermark.

The processor 135 can apply one or more of the dynamic range modification techniques described in this invention to a single image 115. For example, the processor 135 can apply technique A and technique B. The processor 135 communicates the applied techniques to the processor 155. Consequently, after the camera 105 records the displayed image, the processor 155 applies the inverse of technique B and then the inverse of technique A to the displayed image, to obtain the original image 115. The processor 155 applies the techniques A and B in reverse order of processor 135.

Figure 3:
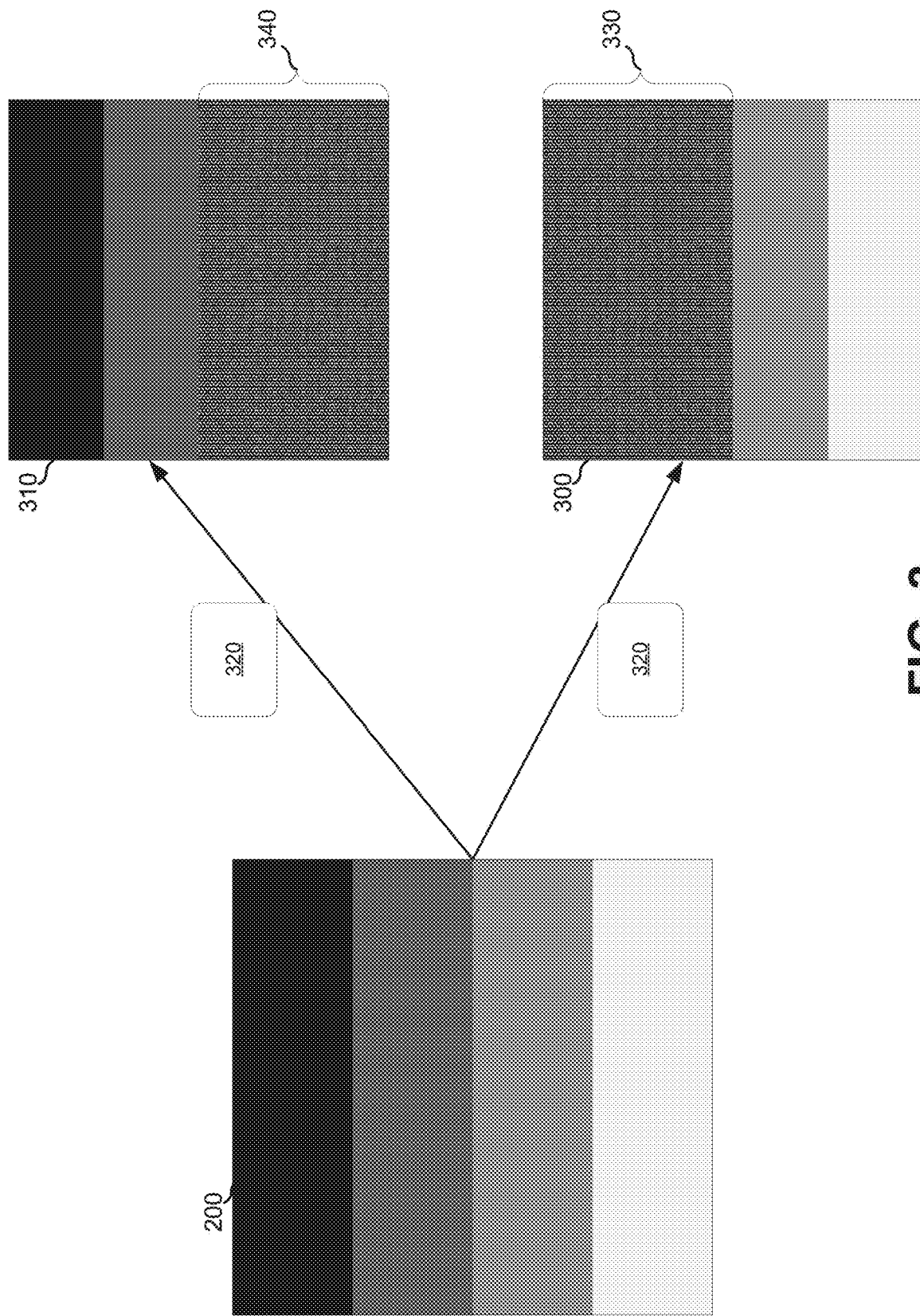
FIG. 3 shows splitting of the image based on luminance.

FIG. 3 shows splitting of the image 200 based on luminance. To increase dynamic range of an image recorded from a virtual production display, a processor can split the image 200, based on a luminance threshold ("threshold") 320, into a first image 300, and a second image 310, where the first image includes brighter portions of the image 200 than the second image 310. For example, the first image 300 can include pixels from the image 200 that are brighter than the luminance threshold 320, while the second image 310 can include pixels from the image 200 that are equal to or darker than the luminance threshold 320. The display 110 can show the first image 300 and the second image 310 in an alternating fashion.

The luminance threshold 320 can correspond to the maximum luminance of the display 110 in FIG. 1A. For example, the luminance threshold 320 can be the same as the maximum luminance of the display 110, or a fraction of the maximum luminance of the display.

Alternatively, the luminance threshold 320 can correspond to the luminance range contained in the image 200. For example, the luminance threshold 320 can be a fraction of the maximum luminance of the image, such as 50%.

The regions 330, 340 of the images 300, 310, respectively, represent the portion of the image 200 that is not included in the images 300, 310, respectively. The regions 330, 340 can include a predetermined value indicating that the portion of the images 300, 310 is functionally equivalent to a green screen, that is, a region that needs to be replaced in post-production. The predetermined value can be black, such as 0.

Figure 4:
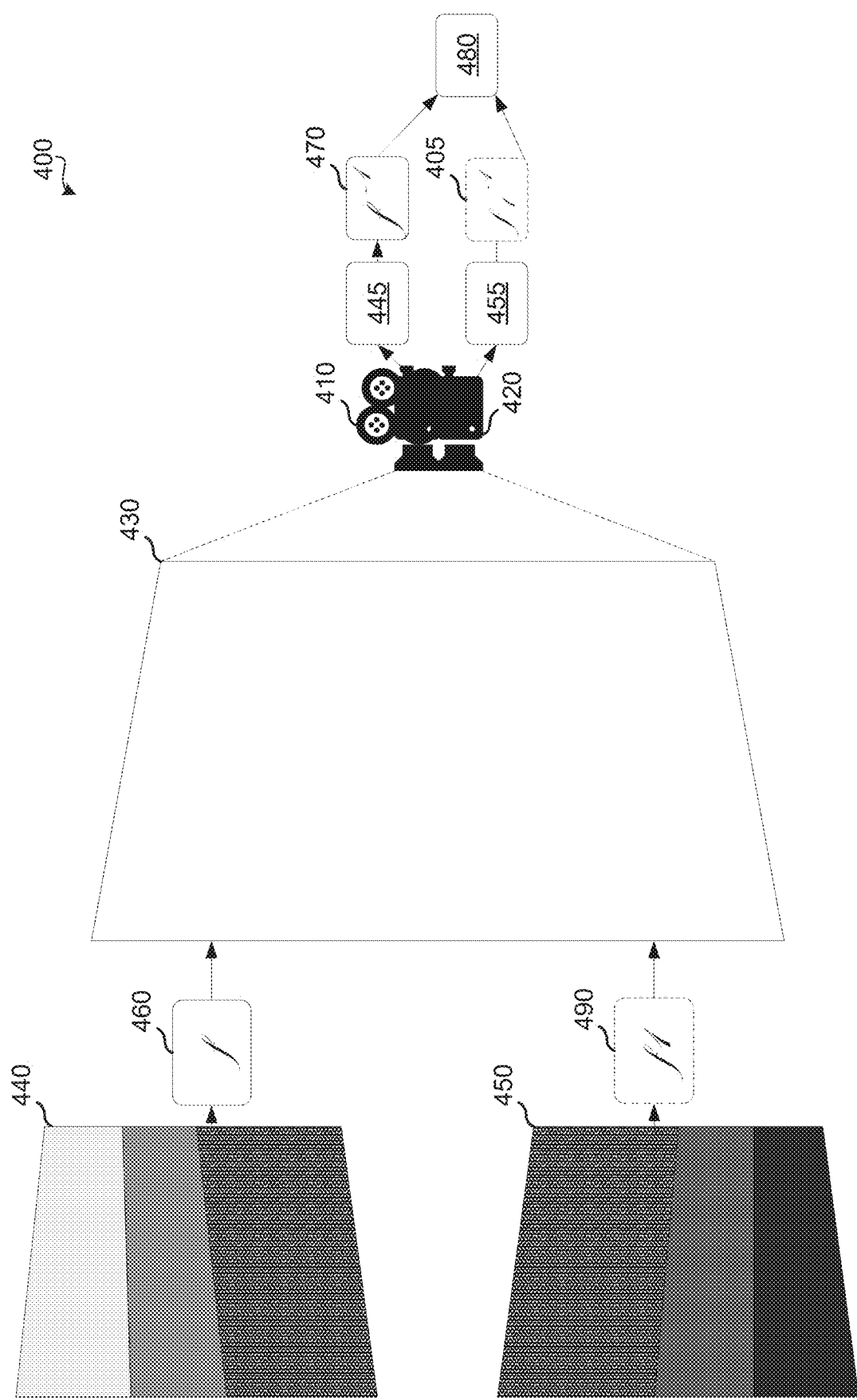
FIG. 4 shows a system to record the first image and the second image.

FIG. 4 shows a system to record the first image and the second image. The system 400 includes two cameras 410, 420 and the display 430. The display 430 can be an all-around display, as shown in FIG. 1A.

The cameras 410, 420 can be synchronized to the display 430, such that when the display is presenting the first image 440 the camera 410 is recording, and the camera 420 is not. Similarly, when the display is presenting the second image 450, the camera 420 is recording, and the camera 410 is not. Consequently, the camera 410 can consistently record the first image 440 containing brighter pixels to obtain recorded image 445, while the camera 420 can consistently record the second image 450 containing darker pixels to obtain recorded image 455. The two images can be combined in postprocessing, after being recorded, to re-create an image 480 having a high dynamic range.

The benefit of alternating the first image 440 and the second image 450 is at least twofold. First, presenting only the bright portions of the image or only the dark portions of the image enables the display to dedicate the full range of the display's luminance to just the bright portions of the image or just the dark portions of the image. Second, recording only the bright portions of the image or recording only the dark portions of the image enables independent postprocessing of the bright portions and the dark portions of the image.

To explain the first benefit, let us assume that the display 430 can show pixels having a luminance between 0 and 100, while the image 200 in FIG. 2 includes pixels having a luminance between 0 and 200. The first image 440 can contain pixels having the luminance between 101 and 200, while the second image 450 can contain pixels having the luminance between 0 and 100. By displaying the two images 440 and 450 independently, the processor enables the display 430 to use the full luminance range 0 to 100 to display the dark pixels of image 450, and also enables the display to use the full luminance range 0 to 100 to display the bright pixels of image 440. Without splitting the image 200 into images 440 and 450, the display 430 would have to use the luminance range 0 to 100 to display the full range of luminance 0 to 200. Consequently, different luminance values in the image 200 would have to be mapped to the same luminance value of the display 110.

Regarding the second benefit, a processor receiving the bright image 440 recorded by the camera 410 can apply a function to the recording of the bright image 440 to further increase the luminance of the bright image 440. Specifically, let us assume, as explained above, that the pixels having luminance between 101 and 200 need to be presented on the display 430 having luminance range of 0-100. To map the values 101-200 to 0-100, a first processor, in a preprocessing stage, can apply a function 460 to the first image 440. The display 430 can display the resulting image. The camera 410 can record the resulting image. A second processor, in a postprocessing stage, can apply an inverse function 470 to the recorded image 445. The inverse function 470 is an inverse of the function 460. The inverse function 470 can take the values in the range 0-100, and convert them to the values in the range 101-200, thereby closely approximating or even re-creating the first image 440. Finally, the second processor can combine the re-created first image 440 and the recorded second image 450 to obtain the final image 480. The final image 480 can exactly match or closely correspond to the input image 200 in FIG. 2.

Optionally, the second image 450 can also go through preprocessing and postprocessing steps. Let us assume that the display 430 can show pixels having a luminance between 0 and 100, while the input image 200 includes pixels having a luminance between 0 and 400. The first image 440 can contain pixels having the luminance between 201 and 400, while the second image 450 can contain pixels having the luminance between 0 and 200. To map the values 0-200 to 0-100, the first processor, in a preprocessing stage, can apply a function 490 to the second image 450. The display 430 can display the resulting image. The camera 420 can record the resulting image. The second processor, in a postprocessing stage, can apply an inverse function 405 to the recorded image 455. The inverse function 405 is an inverse of the function 490. The inverse function 405 can take the values in the range 0-100, and convert them to the values in the range 0-200, thereby closely approximating or even re-creating the second image 450. Finally, the second processor can combine the re-created first image 440 and the re-created second image 450 to obtain the final image 480. The final image 480 can match the input image 200 in FIG. 2.

Figure 5A:
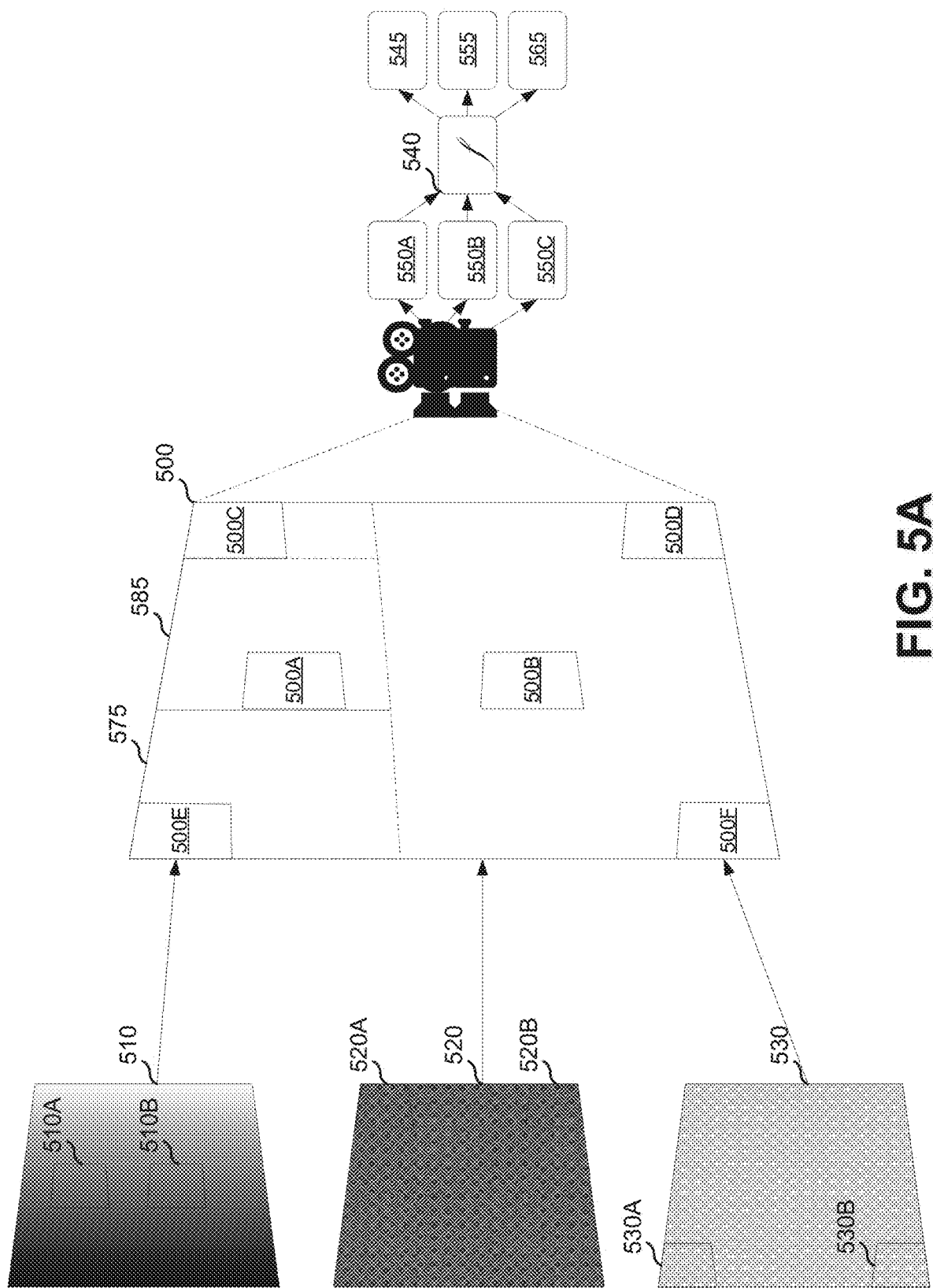
FIG. 5A shows a system to calibrate the luminance of the display.

FIG. 5A shows a system to calibrate the luminance of the display. The display 500 can be a part of the virtual production display 110 in FIG. 1A, or can be a standalone display such as a computer monitor, a TV, a tablet display, a mobile device display, a wearable display, etc. To calibrate the luminance of the display 500, a processor can obtain one or more images 510, 520, 530 and present the image 510, 520, 530 on the display 500. The processor can determine the luminance of a region 510A, 520A, 530A in the image 510, 520, 530, and the corresponding luminance of a region 500A, 500C, 500E on the display 500, when the display is presenting the image 510, 520, 530, respectively. The region 510A, 520A, 530A can correspond to a single pixel or to a group of pixels in the image 510, 520, 530. Each image 510, 520, 530 can have multiple regions 510A, 510B, 520A, 520B, 530A, 530B (only two labeled in each image for brevity), and multiple corresponding regions 500A, 500B, 500C, 500D, 500E, 500F on the display. The multiple regions 510A, 510B of a single image 510 cover the whole image 510. The multiple regions 510A, 510B can overlap.

The processor can determine a difference between the luminance of the region 510A, 520A, 530A in the image 510, 520, 530, and the luminance of the region 500A on the display 500. Based on the difference, the processor can determine how the display 500 modifies the luminance contained in the image 510, 520, 530. To determine the modification of the luminance, the processor can fit a function 540 through the obtained luminance values, as explained below. The function 540 can take as input luminance of the displayed image, and produce as output the luminance of the input image 510, 520, 530.

In another implementation, the processor can determine the correspondence between the luminance of the regions 510A, 510B, 520A, 520B, 530A, 530B and the luminance of the regions 500A, 500B, 500C, 500D, 500E, 500F corresponding to the regions in the recorded image 550A, 550B, 550C. In this implementation, the function 540 can take as input luminance of the recorded image 550A, 550B, 550C and produce as output image 545, 555, 565. The luminance of the output image 545, 555, 565 can exactly match or closely approximate the luminance of the input image 510, 520, 530, respectively.

The function 540 can be used in conjunction with one or more of the luminance modification techniques described in this invention in a single image 115. For example, the processor 135 in FIG. 1B can initially apply image splitting and subsequently the calibration function to a single image. After the camera 105 in FIGS. 1A-1B records the displayed image, the processor 155 in FIG. 1B can initially apply the inverse of the calibration function, and subsequently reverse the image splitting to obtain the original image 115.

The calibration images 510, 520, 530 can contain varying patterns used in calibrating the display 500. For example, the calibration image 510 can contain a gradient from a minimum to a maximum brightness. The calibration image 520 can include low luminance values, while the calibration image 530 can include high luminance values.

The display 500 can be calibrated as a single unit, or can be split into two or more tiles 575, 585 which can be calibrated separately. If the tiles are calibrated separately, each tile can have a corresponding function 540.

Figure 5B:
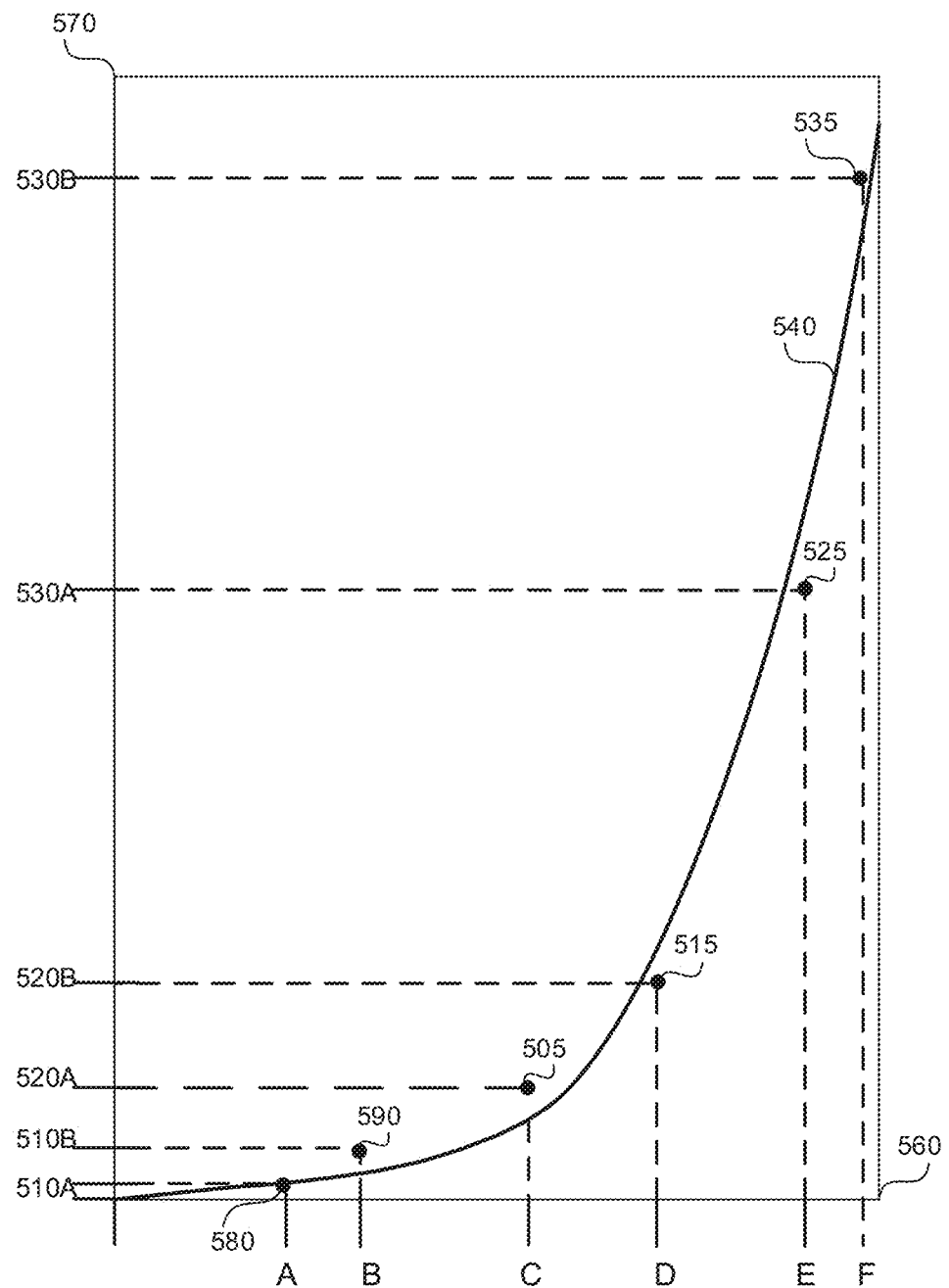
FIG. 5B shows fitting a function to mutually corresponding pixel value regions.

FIG. 5B shows fitting a function to mutually corresponding luminance regions. The X-axis 560 represents the luminance of a region 500A-F of the displayed image, while the Y-axis 570 represents the luminance of a region 510A, 510B, 520A, 520B, 530A, 530B of the input image. In another implementation, where the processor determines the correspondence between the luminance of the regions 510A, 510B, 520A, 520B, 530A, 530B and the luminance of the regions in the recorded image 550A, 550B, 550C, the X-axis 560 represents the luminance of a region in the recorded image 550A, 550B, 550C.

A processor can fit the function, e.g., calibration function, 540 through the points 580, 590, 505, 515, 525, 535 (only six labeled for brevity). The fit of the function can be estimated using metrics, such as least-squares distance between the function and the points 580, 590.

Figure 6:
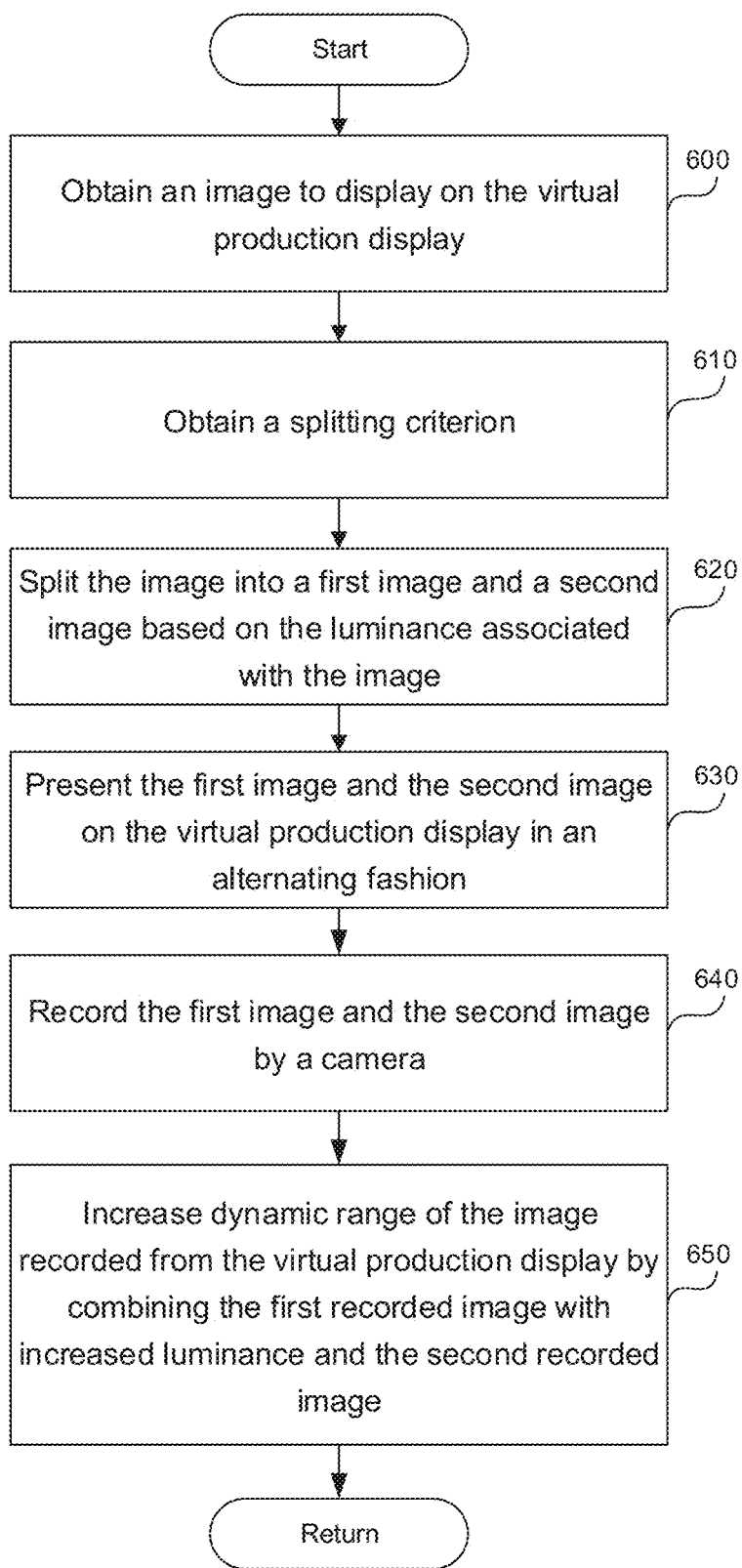
FIG. 6 is a flowchart of a method to increase dynamic range of an image recorded from a display, according to one technique.

FIG. 6 is a flowchart of a method to increase luminance of an image recorded from a display, according to one technique. In step 600, a hardware or software processor executing instructions described in this application can obtain the image to display on a display, such as a virtual production display, a computer monitor, a TV, a display of a mobile device, a display of a tablet, a display of a wearable device, etc.

In step 610, the processor can obtain a splitting criterion, where the splitting criterion indicates how to separate the image. In one implementation, to obtain the splitting criterion the processor can calibrate the display by obtaining a pixel value threshold associated with the display. The pixel value threshold can indicate a pixel value between a minimum pixel value that can be presented on the display in a maximum pixel value that can be presented in a display. The processor can obtain the splitting criterion indicating to split the input image based on the pixel value threshold. In another implementation, to obtain the splitting criterion, the processor can obtain an indication to split the input image based on a region.

In step 620, the processor can split the image into a first image and a second image based on the splitting criterion. Combining the first image and the second image produces the image. The processor can replace portions of the first image not included in the image by a predetermined value, and replace portions of the second image not included in the image by the predetermined value. The predetermined value can be 0.

In one implementation, to split the image into the first image and the second image, the processor can obtain the pixel value threshold, and multiple regions associated with the image. A region can be a pixel or a group of pixels in the image. The processor can obtain a pixel value of the region among the multiple regions. If the region is a single pixel, the pixel value of the region is the pixel value of the pixel. If the region contains multiple pixels, the pixel value of the region can be a function of pixel value of each pixel contained in the region. The function can be an average or can be a weighted function. The weighted function can add more weight to the pixel value of pixels in the middle of the region and less weight to the pixel value of the pixels on the periphery of the region. The processor can determine whether the pixel value of the region is above the pixel value threshold. Upon determining that the pixel value of the region is above the pixel value threshold, the processor can add the region to the first image, thereby obtaining the first image including brighter portions of the input image than the second image.

In another implementation, after obtaining an indication to split the image based on the region, the processor can split the input image into the first image and the second image including assigning the region to the first image and a remainder of the input image to the second image.

In step 630, the processor can present the first image and the second image on the display in an alternating fashion. In step 640, the processor can record the first image by a first camera to obtain a first recorded image, and can record the second image by a second camera to obtain a second recorded image. The first camera and the second camera can be the same camera. The first camera can be synchronized to the display to record the first image, and the second camera can be synchronized to the virtual production display to record the second image. In other words, the first camera can be synchronized to record while the first image is displayed, and to not record while the second image is displayed. The second camera can be synchronized to record while the second image is displayed, and to not record while the first image is displayed.

In step 650, the processor can increase the dynamic range of the image recorded from the virtual production display by combining the first recorded image and the second recorded image.

The processor can increase the luminance of the first recorded image to obtain a first recorded image with increased luminance. To increase the luminance, the processor can obtain a luminance of a region among multiple regions associated with the first image. The processor can increase the luminance of the first recorded image by applying a function to the luminance of the region, where the function receives the luminance of the region as input, and produces an output increasing the luminance of the region.

The function can include an inverse of a hybrid log-gamma function, an inverse of a log encoding function, an inverse of a perceptual quantizer function, and/or a calibration function. The processor can combine one or more functions and apply one function after the other. To increase the luminance, the processor applies the functions in reverse of the order in which the processor applies the functions prior to presenting the image on the display.

Prior to presenting the first image, the processor can decrease luminance of the first image by applying the function to the first image. The processor can increase luminance of the first recorded image by obtaining a luminance of a region among multiple regions associated with the first image, and by applying an inverse of the function to the luminance of the region. The inverse of the function receives the luminance of the region as input, and produces an output increasing the luminance of the region.

The processor can calibrate the display by determining a calibration function. To determine the calibration function, as explained in FIGS. 5A-5B, the processor can obtain a first luminance of a display region, and a second luminance of an image region corresponding to the display region. The display region presents the image region. The processor can determine a difference between the first luminance and the second luminance. As explained in FIGS. 5A-5B, there can be multiple first luminance values and multiple corresponding second luminance values, whose relationships are approximated by the calibration function 540 in FIG. 5B. Based on the difference between the first luminance and the second luminance, the processor can obtain a function 540 correlating the first luminance and the second luminance. The processor can determine a region in the first recorded image corresponding to the virtual production display region. Finally, the processor can increase the luminance of the first recorded image by applying the function to the region in the first recorded image corresponding to the virtual production display region.

To determine which technique to apply prior to displaying the image and after recording the displayed image, respectively, the processors 135, 155 in FIG. 1B can synchronize. The processor 135 can perform preprocessing, namely, modifying the image prior to the display, and the processor 155 can perform postprocessing, namely, modifying the image after the image is recorded. The processors 135, 155 can obtain an input indicating a technique among multiple techniques, where the technique is configured to increase dynamic range of an image recorded from a virtual production display. The processors 135, 155 can receive an input through a hardware, such as a dial or a switch. The processors 135, 155 can wirelessly communicate with each other. The processor 135 can encode an indication of the technique used in the image, and the processor 155 can decode the indication of the technique from the recorded image. The processors 135, 155 can be the same processor, or can be different processors.

The processor 135 can apply a first portion of the technique to the image prior to displaying the image on the virtual production display. After applying the technique, the processor 135 can send a signal to the processor 155 indicating the technique, as described above. The processor 155 can apply a second portion of the technique to an image recorded from the virtual production display. The first portion of the technique and the second portion of the technique can be inverses of each other.

The virtual production display can contain sources of light that are external to the display, such as a lamp on the virtual production set. The processor can identify the external sources of light and can provide a special treatment to the external sources of light. In one implementation, the processor can determine a source of light external to the display. The processor can adjust intensity of the source of light by a factor corresponding to a number of images into which the input image is split. In another implementation, the processor can determine a region in the first recorded image and the second recorded image corresponding to a source of light external to the display. The processor can ensure the region is not combined twice when combining the first recorded image and the second recorded image.

Figure 7:
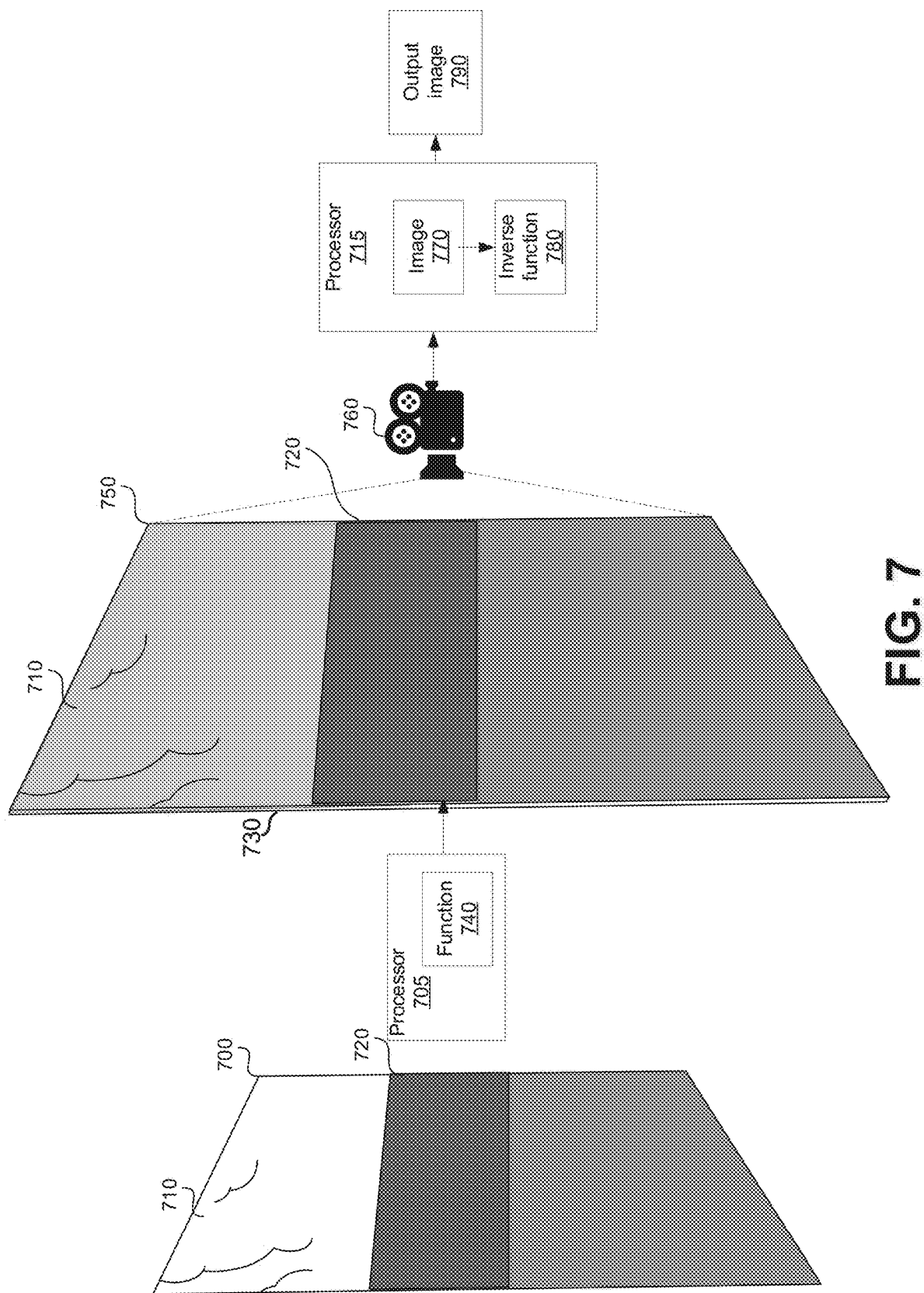
FIG. 7 shows a system to increase dynamic range of an image recorded from a virtual production display, according to one implementation.

II. Increasing Dynamic Range of a Virtual Production Display Using a Reversable Dynamic Range Mapping Operation FIG. 7 shows a system to increase dynamic range of an image recorded from a virtual production display, according to one implementation. An input image 700 can include a region 710 of high pixel value, and a region 720 of low pixel value. The display 730 has a limited range of pixel value, such as between 0 and 100, where 0 can be the first pixel value of the display, and 100 can be the second pixel value of the display. The second pixel value can be higher than the first pixel value. The first pixel value can be the minimum pixel value, while the second pixel value can be the maximum pixel value. The region 710 of high pixel value can have pixel value in the range 101-200, while the region 720 of low pixel value can have pixel value in the range 0-100.

Figure 8A:
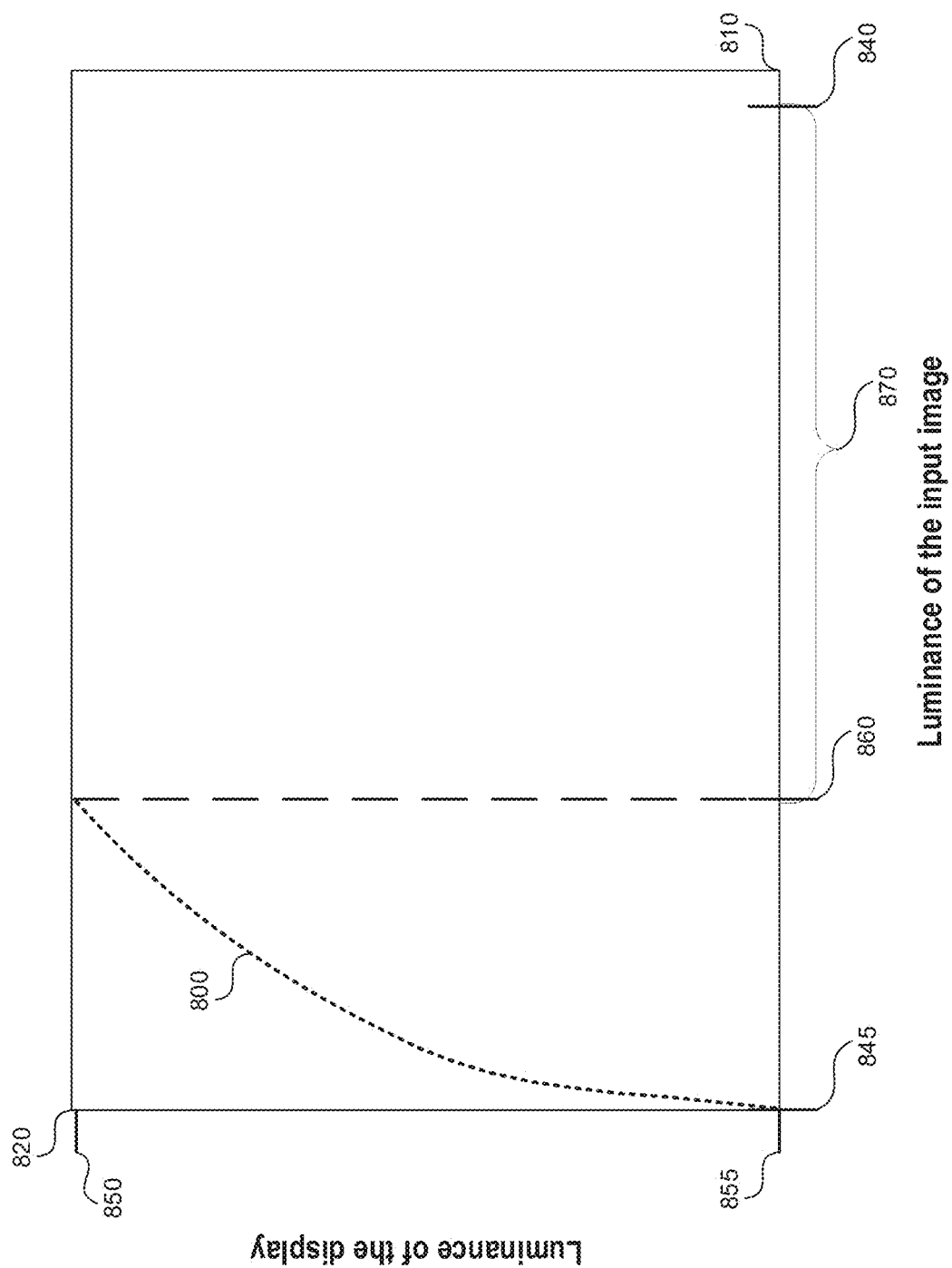
FIG. 8A shows a standard dynamic range gamma function ("gamma function").

Generally, to enable the display 730 to present the region 710 of high pixel value, the image 700 includes pixel values to which a function 800 in FIG. 8A has been applied. The function 800 maps the pixel values above the second pixel value of the display into the pixel value range of the display, e.g., between 0 and 100. However, the function 800 may still clip the high pixel values, as explained in FIG. 8A. Instead of applying the function 800 that clips the high pixel values, a processor 705, performing a preprocessing step, can apply a high dynamic range (HDR) function 740 that maps the pixel value range contained in the image, e.g., 0-200, to distinct values in the display 730 pixel value range, e.g., 0-100. Consequently, the function 740 does not clip the high pixel values in the image 700.

Upon applying the function 740, the display 730 can display the modified image 750, in which the pixel value range is within the pixel value range of the display 730. For example, the pixel value range of the modified image 750 is within 0-100.

A camera 760 can record the modified image 750. A processor 715 performing a postprocessing step can receive the recorded modified image 770 having a pixel value range corresponding to the pixel value range of the display 730, e.g., 0-100. The processor can apply the inverse function 780 to obtain the output image 790 containing the original pixel value of the image 700. The inverse function 780 is the inverse of the new HDR function 740.

In one embodiment, the image 700 can contain pixel values to which function 800 has not been applied. In that case, the processor 705 performing the preprocessing step applies the function 740 to map the range of the pixel value to 0-100, and the processor 715 performing the postprocessing step applies the inverse function 780 to map pixel value 0-100 to the image pixel value 0-200.

In another implementation, the image 700 can contain pixel values to which function 800 has been applied. In that case, the processor 705 can apply an inverse of the function 800 to obtain pixel values in the range 0-200, and subsequently apply the function 740 to map pixel values in the range 0-200 to the range 0-100. The processor 715 performing the postprocessing step applies the inverse function 780 to the recorded modified image 770 to obtain the output image 790 containing the pixel values 0-200. The output image 790 can closely approximate, or even exactly match, the input image 700.

FIG. 8A shows a standard dynamic range gamma function ("gamma function") 800. The X-axis 810 represents the pixel value of the input image 700 in FIG. 7, while the Y-axis 820 represents the pixel value of the display 730 in FIG. 7. Value 840 represents the maximum desired pixel value. The maximum desired pixel value 840 can be the maximum pixel value contained in the input image 700, the maximum pixel value that the camera 760 can record, and/or the maximum pixel value that an observer of the image can perceive. Value 850 represents the maximum pixel value the display 730 can present. Value 850 is greater than value 840. Value 845 is the minimum desired pixel value, while value 855 is the minimum pixel value the display 730 can present. Values 845 and 855 can both be 0.

The maximum pixel value the display 730 can present and the minimum pixel value the display can present can vary depending on what else is presented on display, as described in this application. Specifically, the display can be limited by the amount of power that it can draw, and the maximum pixel value can vary based on how much of the presented image has high luminance.

The gamma function 800 maps the larger range from value 845 to value 840 into the range from value 855 to value 850. As can be seen in FIG. 8A, past a certain value 860, all values in the range 870 are clipped. In other words, all values in the range 870 map to the same maximum pixel value 850. Once the pixel value is clipped, and the clipped pixel value is presented on the display 730, the camera 760 and the processor 715 in FIG. 7 cannot retrieve the original pixel values contained in the input image 700.

Figure 8B:
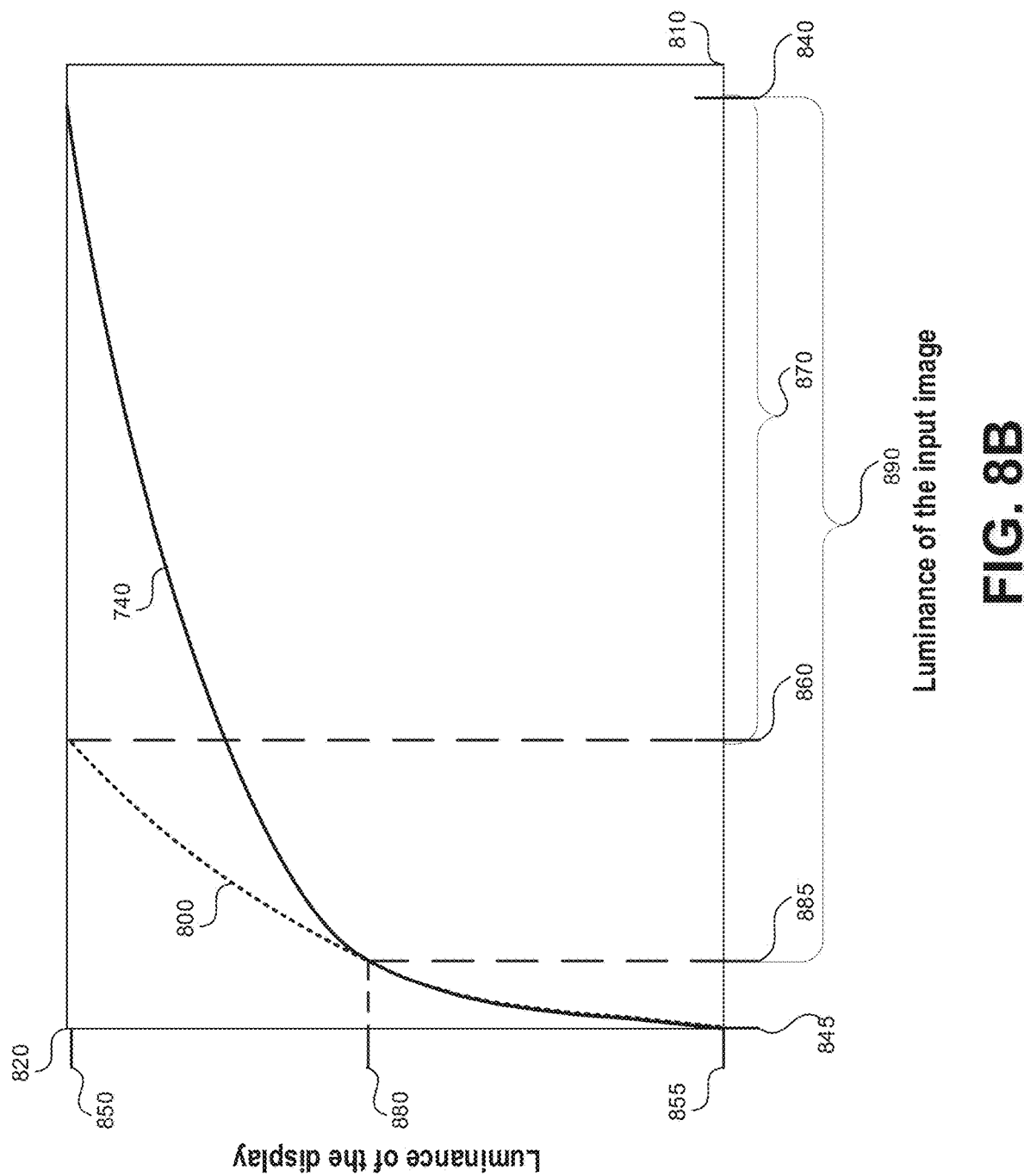
FIG. 8B shows a high dynamic range (HDR) function overlapping with the gamma function.

FIG. 8B shows an HDR function 740 overlapping with the gamma function 800. The HDR function 740 can depend on properties of the display 730, such as the minimum pixel value and the maximum pixel value, and the properties of the desired pixel value.

A processor can obtain a threshold pixel value ("threshold") 880 between the first pixel value of the virtual production display and the second pixel value of the virtual production display, where the first pixel value can be the minimum pixel value that the virtual production display can present, and the second pixel value can be the maximum pixel value that the virtual production display can present. The threshold can be higher than the average of the second pixel value 850 and the first pixel value 855. For example, the threshold 880 can be 0.8 times the second pixel value 850 plus 0.2 times the first pixel value 855.

Up until the threshold 880, the HDR function 740 can match the gamma function 800; however, at the threshold 880, the HDR function 740 can diverge from the gamma function 800 by mapping the desired pixel value to a lower pixel value of the display 730 than the gamma function 800. As a result, the pixel values in the range 890, including the range 870, are mapped to the distinct pixel value of the display 730, and are not clipped. Consequently, once the camera 760 records the image processed using the HDR function 740, the processor 715 in FIG. 7 can extract the original pixel values contained in the input image 700, as explained in FIG. 5B.

At the pixel value 885, the gamma function 800 and the HDR function 740 produce the same output value, namely, the threshold 880. In addition, the gamma function 800 and the HDR function 740 have the same first derivative at the pixel value 885.

Figure 9A:
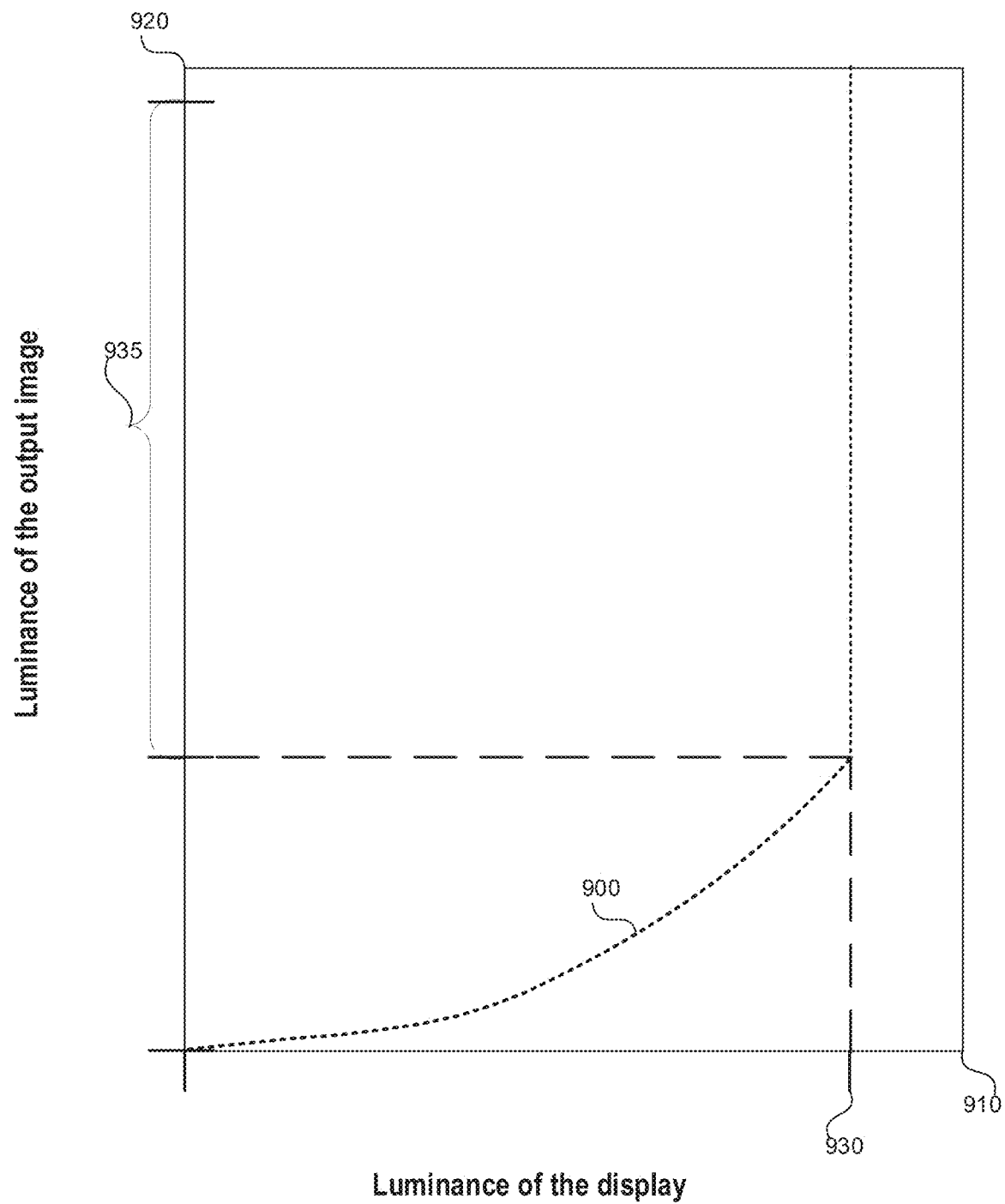
FIG. 9A shows a function which is the inverse of the gamma function.

FIG. 9A shows a function 900 which is the inverse of the gamma function 800. The X-axis 910 represents the pixel value of the display 730 in FIG. 7, while the Y-axis 920 represents the pixel value of the output image 790 in FIG. 7. All pixel values of the display 730 reaching or exceeding value 930 can correspond to any value in the range 935. The value 930 can correspond to the maximum pixel value of the display 730 in FIG. 7. Consequently, applying the function 900 cannot accurately re-create the output image 790, so that the pixel value of the output image 790 matches the pixel value of the input image 700 in FIG. 7.

Figure 9B:
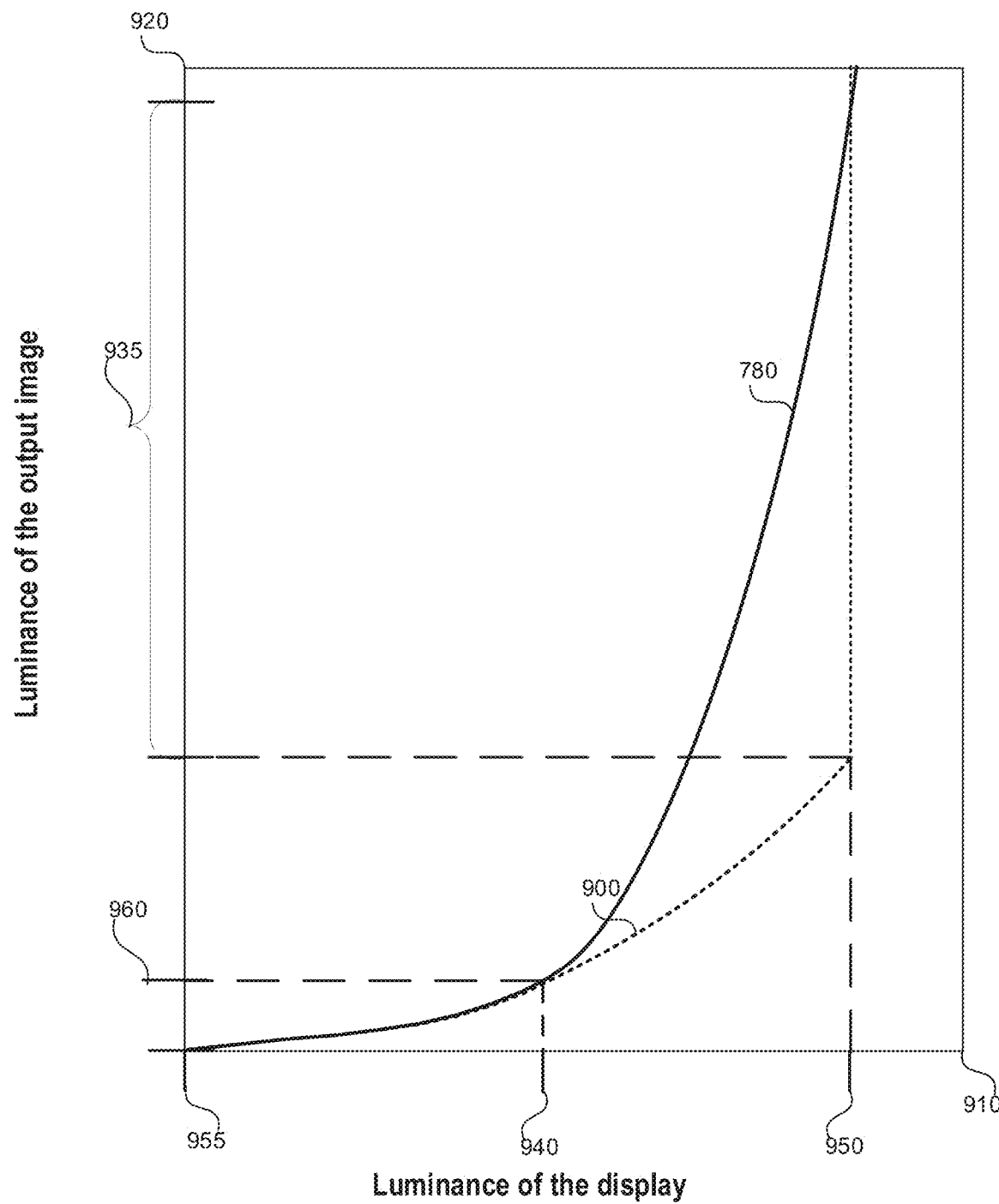
FIG. 9B shows a function which is the inverse of the HDR function.

FIG. 9B shows a function 780 which is the inverse of the HDR function 740 in FIG. 8B. A processor can obtain a threshold pixel value ("threshold") 940 between the minimum pixel value 955 of the virtual production display 730 in FIG. 7 and the maximum pixel value 950 of the virtual production display. The threshold pixel value 940 can be higher than the average of the maximum pixel value 950 and the minimum pixel value 955.

Up until the threshold 940, the function 780 can match the function 900. At the threshold 940, the function 780 can diverge from the function 900 by mapping the output pixel value to a higher pixel value in the output image 790 in FIG. 7 than the function 900. As a result, the pixel values in the range 935 are mapped to a distinct pixel value in the output image 790, and are not clipped. Consequently, once the camera 760 in FIG. 7 records the image processed using the HDR function 740, the processor 715 in FIG. 7 can extract the original pixel values contained in the input image 700.

At the threshold 940, the function 900 and the function 780 produce the same output value 960. In addition, the function 900 and the function 780 have the same first derivative at threshold 940.

Figure 10A:
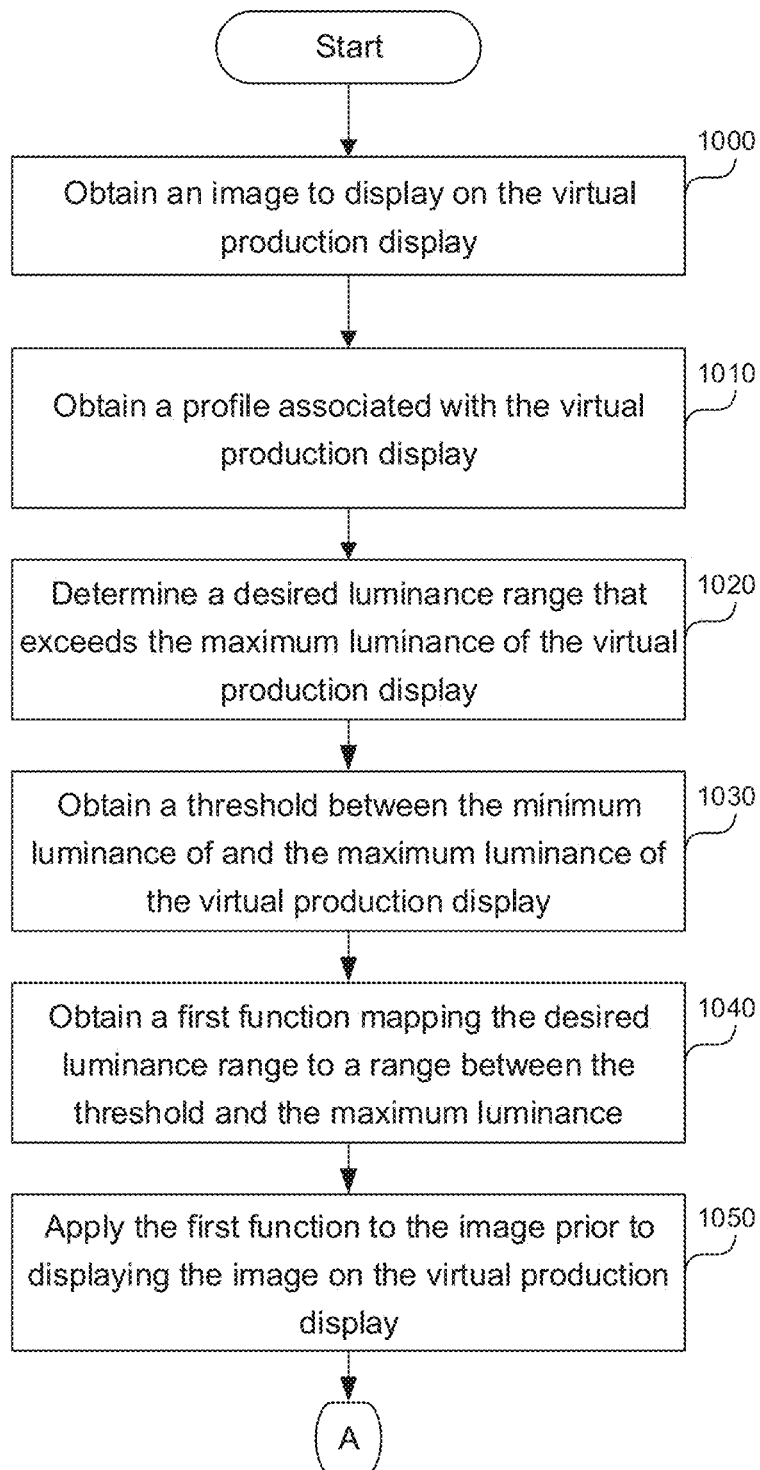
FIGS. 10A-10B show a flowchart of a method to increase dynamic range of an image recorded from a display, according to another technique.
Figure 10B:
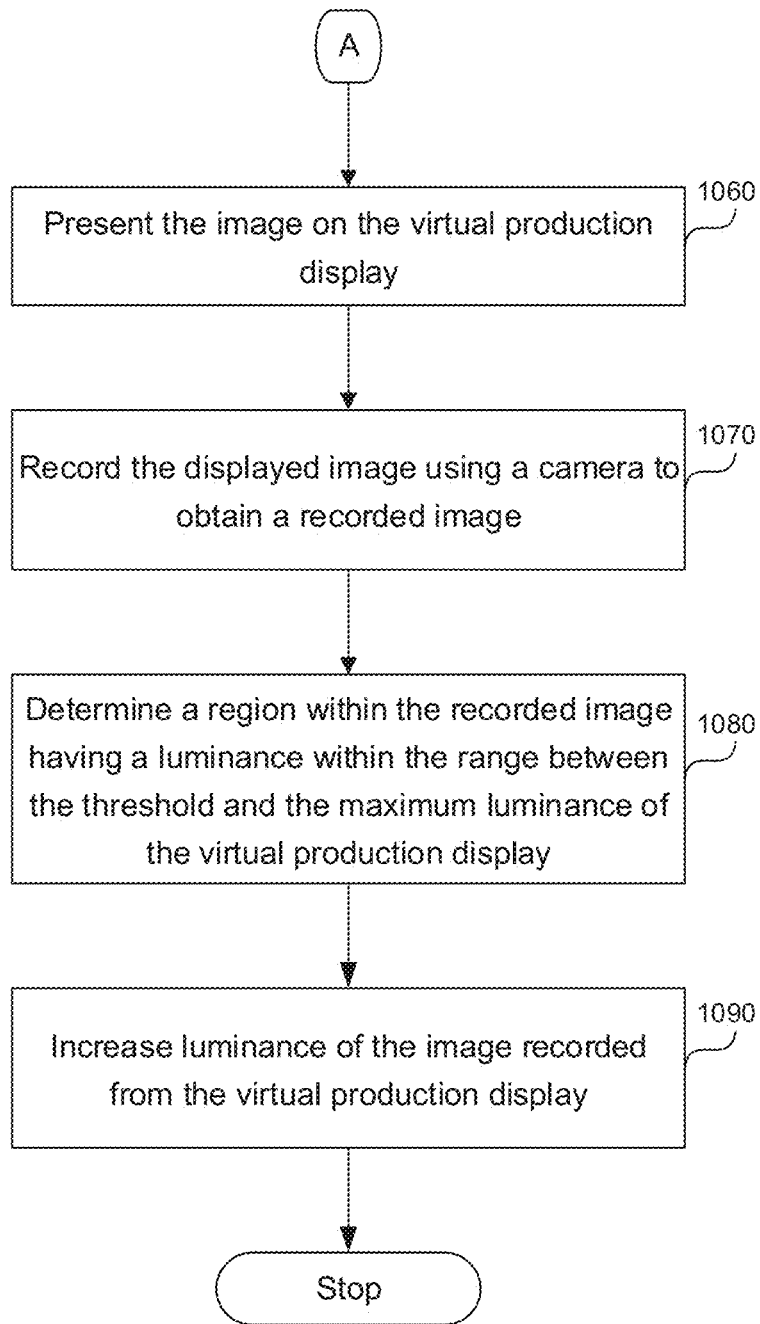

FIGS. 10A-10B show a flowchart of a method to increase dynamic range of an image recorded from a display, according to another technique. In step 1000, a hardware or software processor executing instructions described in this application can obtain the image to display on a display, such as a virtual production display, a computer monitor, a TV, a display of a mobile device, a display of a tablet, a display of a wearable device, etc.

In step 1010, the processor can obtain a profile associated with the virtual production display, where the profile associated with display indicates a region of the display and a range of pixel values that the region of the display can present. A pixel value is a set of numbers defining hue, saturation and intensity. For example, to obtain the profile, the processor can obtain a first pixel value of the virtual production display and a second pixel value of the virtual production display. The second pixel value can be higher than the first pixel value. The first pixel value can be the minimum pixel value the display can present, while the second pixel value can be the maximum pixel value the display can present.

In step 1020, the processor can determine a desired pixel value range that exceeds the second pixel value of the virtual production display. In one implementation, the desired pixel value range can correspond to a pixel value that the camera can record and that exceeds the profile, e.g. the dynamic range, of the virtual production display. In another implementation, the desired pixel value range can correspond to a pixel value that an observer of the image can perceive and that exceeds the dynamic range of the virtual production display. In a third implementation, the desired pixel value range corresponds to a maximum pixel value that can be recorded in the image and that exceeds dynamic range of the virtual production display. The dynamic range of the virtual production display is between minimum and maximum pixel value of the virtual production display. The dynamic range can be lower than maximum pixel value due to power constraints or safety reasons. For example, the virtual production display can be powered by batteries, in which case, the power to the virtual production display is limited and operating the virtual production display at maximum pixel value is undesirable.

In step 1030, the processor can obtain a threshold between the first pixel value of the virtual production display and the second pixel value of the virtual production display. The first pixel value and the second pixel value indicate a range within the profile associated with the virtual production display. The first pixel value can be the minimum pixel value of the display, while the second pixel value can be the maximum pixel value of the display. The threshold can be higher than the average of the first pixel value and the second pixel value. For example, the threshold can be a weighted average of the first pixel value and the second pixel value, where the second pixel value has a weight higher than 0.5, and the first pixel value has a weight of (1−the weight of the second pixel value). In another example, the threshold can be equal to the second pixel value of the display. In a third example, the threshold can be 80% of the second pixel value.

In step 1040, the processor can obtain a first function mapping the desired pixel value range to a range between the threshold and the second pixel value of the virtual production display. The processor can obtain the first function from a lookup table, or the processor can calculate the first function based on the brightness of the image or the sequences explained below. In one implementation, the first function can vary for each image presented on the display. For example, for a darker image, the first function can map dark pixels in the input image to brighter values to be displayed on the display, similar to function 800 in FIG. 8A. For a lighter image, the first function can map bright pixels in the input image to darker values to be displayed in the virtual production display, to be able to accommodate pixels in the image that are brighter than the second pixel value of the display.

In another implementation, the first function can vary based on a sequence of images, such as a sequence in a movie. For example, a dark sequence can be recorded in a cave, while a bright sequence can be recorded in intense natural light. For the bright sequence, the first function can map dark pixels in the input image to brighter values to be displayed on the display. For the darker sequence, the first function can map bright pixels in the input image to darker values to be displayed in the virtual production display, to be able to accommodate pixels in the image that are brighter than the second pixel value of the display. In this implementation, the same first function can be applied to all the images in the sequence. A processor performing the preprocessing of the image, prior to presenting the image on the display, can communicate the type of the first function used for each image, or for each sequence, to a processor performing the postprocessing of the image. The communication can be done as described in this application, for example, using wireless communication, or communication encoded in the displayed image.

In step 1050, the processor performing preprocessing can apply the first function to the image prior to displaying the image on the virtual production display. In step 1060, the processor can present the image on the virtual production display.

In step 1070, a processor performing postprocessing can record the displayed image using a camera to obtain a recorded image. The same processor can perform both preprocessing and postprocessing.

In step 1080, the processor can determine a region within the recorded image having a pixel value within the range between the threshold and the second pixel value of the virtual production display.

In step 1090, the processor can increase the dynamic range of the image recorded from the virtual production display by applying an inverse of the first function to the pixel value of the region, where the inverse of the first function increases the pixel value of the region. The processor can store the increased pixel value of the region in the image recorded from the virtual production display, or in a new image created based on the image recorded from the virtual production display.

To obtain the first function, the processor can combine one or more other functions. For example, the processor can obtain second function mapping the pixel value of the image to the pixel value of the virtual production display. The second function can include a power function such as gamma curve used in standard dynamic range, sRGB, PQ function, etc. The gamma transfer function can include 2.2-2.4 gamma. The processor can calculate the first function, which can join the second function at the threshold value, as shown in FIG. 8B. In a pixel value range between the first pixel value of the virtual production display and the threshold, the first function corresponds to the second function. In a pixel value range above the threshold, the first function produces a higher pixel value than the second function. The higher pixel value corresponds to the desired pixel value range. The first and the second function have the same value and the same first derivative at the threshold value.

To determine the threshold value, the processor can analyze the image to determine a pixel value infrequently occurring in the image. The processor can assign the infrequently occurring pixel value to the threshold.

Preferably, illuminating the actors 130 and props 140, 150, 160 in FIG. 1A in the virtual production set using an image modified using the first function and presented on the display 110 in FIG. 1A creates believable reflections of the actors and the props. However, if the reflections are not believable, the reflections can be fixed in postprocessing as done currently when the set contains a green screen.

The processor can also obtain the first function by calibrating the display 110 in FIG. 1A, as described in FIGS. 5A-5B. To calibrate the display the processor can obtain a first pixel value of a virtual production display region. The processor can obtain a second pixel value of an image region shown in the virtual production display region. The processor can determine a difference between the first pixel value and the second pixel value. Based on the difference between the first pixel value and the second pixel value, the processor can obtain a calibration function correlating the first pixel value and the second pixel value. To obtain the calibration function, the processor can have multiple first pixel values and multiple second pixel values through which to fit a function. The processor can determine a region in the recorded image corresponding to the virtual production display region. The processor can increase the pixel value of the first recorded image by applying the function to the pixel value of the region in the recorded image corresponding to the virtual production display region.

As explained in this application, the first function can vary between individual images, or between sequences in a movie. The processor 135 in FIG. 1B can communicate the type of the first function used in an image to the processor 155 through wireless communication or image modification, as explained in this application. After the processor 135 applies the first function in preprocessing, the processor 155 applies the inverse of the first function in postprocessing.

To determine which of the brightness increasing techniques described in this application to apply, the processor can obtain an input indicating a technique among multiple techniques, where the technique is configured to increase dynamic range of an image recorded from a virtual production display. The input can be specified through a dial in both the preprocessing components and the postprocessing components, or the input can be wirelessly communicated between the preprocessing components and the postprocessing components. Alternatively, the input can be communicated through the image, or through a synchronization image presented prior to presenting the input image on the virtual production display. Also, the input can be communicated as metadata included in the time code that is already distributed around the site, including the camera. The processor performing preprocessing can apply a first portion of the technique to the image prior to displaying the image on the virtual production display. The processor performing postprocessing can apply a second portion of the technique to an image recorded from the virtual production display. The first portion and the second portion of the technique can be inverses of each other. Multiple techniques described in this application can be combined in a single image to increase the dynamic range of the image. The applied techniques can vary from frame to frame. In other words, each frame can use a technique different from the preceding or the succeeding frame.

The processor can also dynamically adjust the capture camera settings to increase dynamic range of an image recorded from the display. The processor can receive an indication that the first function is a linear function such as an identity function, or a multiplier applied to the whole image. The processor can adjust pixel value of the image recorded from the display by adjusting a camera setting, such as the gain setting or camera exposure. If there are any lights on the virtual production set, the pixel value of the lights can be adjusted in accordance with the adjustment of camera setting. For example, if the camera setting increases the brightness of the recorded image, the pixel value of the on-set lights can be decreased, and vice versa.

Figure 11:
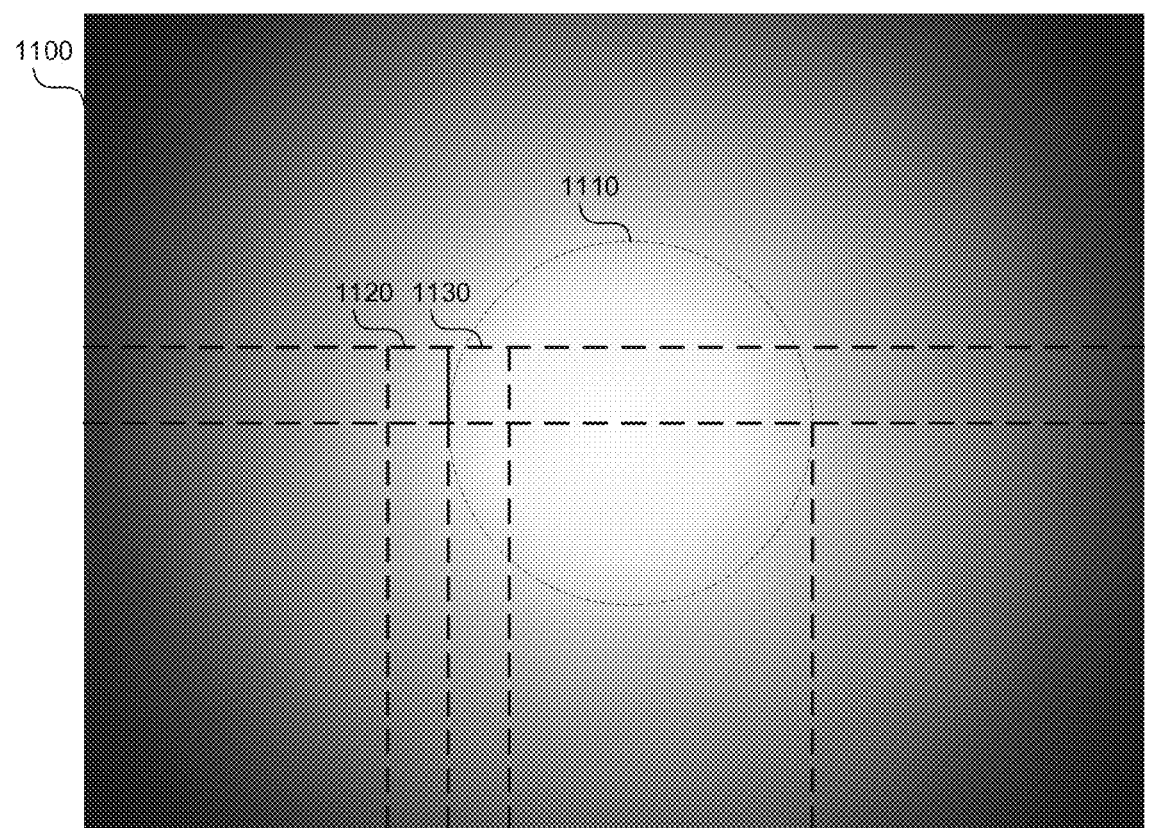
FIG. 11 shows an image containing pixel values exceeding the threshold pixel value of the display.
Figure 11:
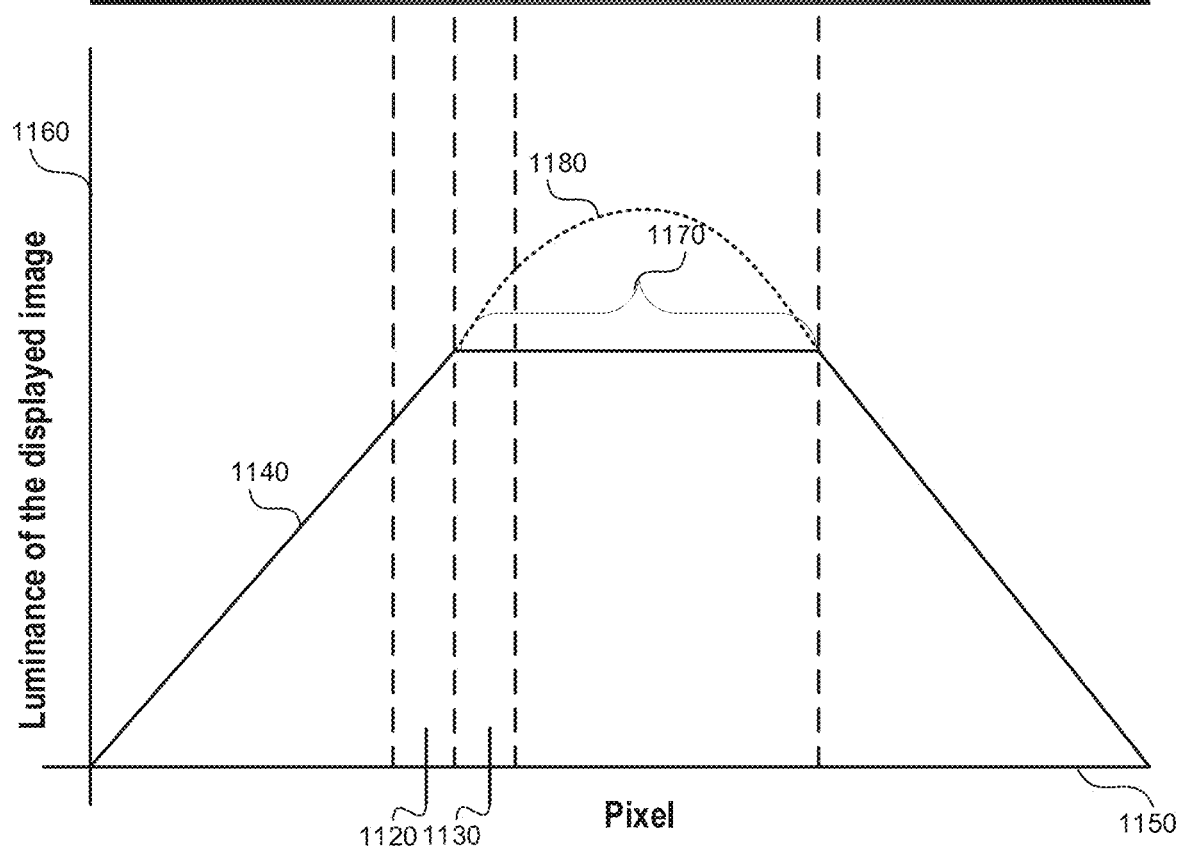

III. Increasing Dynamic Range of a Virtual Production Display Using Image Markers FIG. 11 shows an image containing pixel values exceeding the threshold pixel value of the display. The image 1100 can include a region 1110 whose pixel value exceeds the threshold pixel value of the display 110 in FIG. 1A. The region 1110 can take on any linear, curved, or curvilinear, such as a square, circle, ellipsoid, etc. For example, pixel 1120 has a pixel value matching the threshold pixel value of display 110, whereas pixel 1130 has a pixel value exceeding the threshold pixel value of the display.

The display 110 clips the pixel value of the region 1110 as shown in graph 1140. The X-axis 1150 represents a pixel in the image 1100, such as pixel 1120, 1130. The Y-axis 1160 represents the pixel value of the displayed image. As can be seen in graph 1140, after the pixel value of the region 1110, including pixel 1130, exceeds the threshold pixel value of the display, the display 110 shows all excessive pixel value as the threshold pixel value of the display, visible in a plateau 1170 of the graph 1140. The graph 1180 shows the true pixel value of the image 1100 that has been clipped to the plateau 1170.

Once the processor 155 records the pixel value represented by the graph 1140, the processor 155 cannot reconstruct the pixel value represented by the graph 1180, and represents the pixel value of the region 1110 as the same pixel value. In one implementation, a machine learning model can be trained to detect plateaus, such as plateau 1170, in pixel values and to reconstruct the pixel values represented by the graph 1180. In another implementation, a processor can modify the image 1100 to include a pattern unlikely to occur in the image, where the pattern signals a modified pixel value. In addition, the pattern can indicate the true magnitude of the pixel value.

Figure 12:
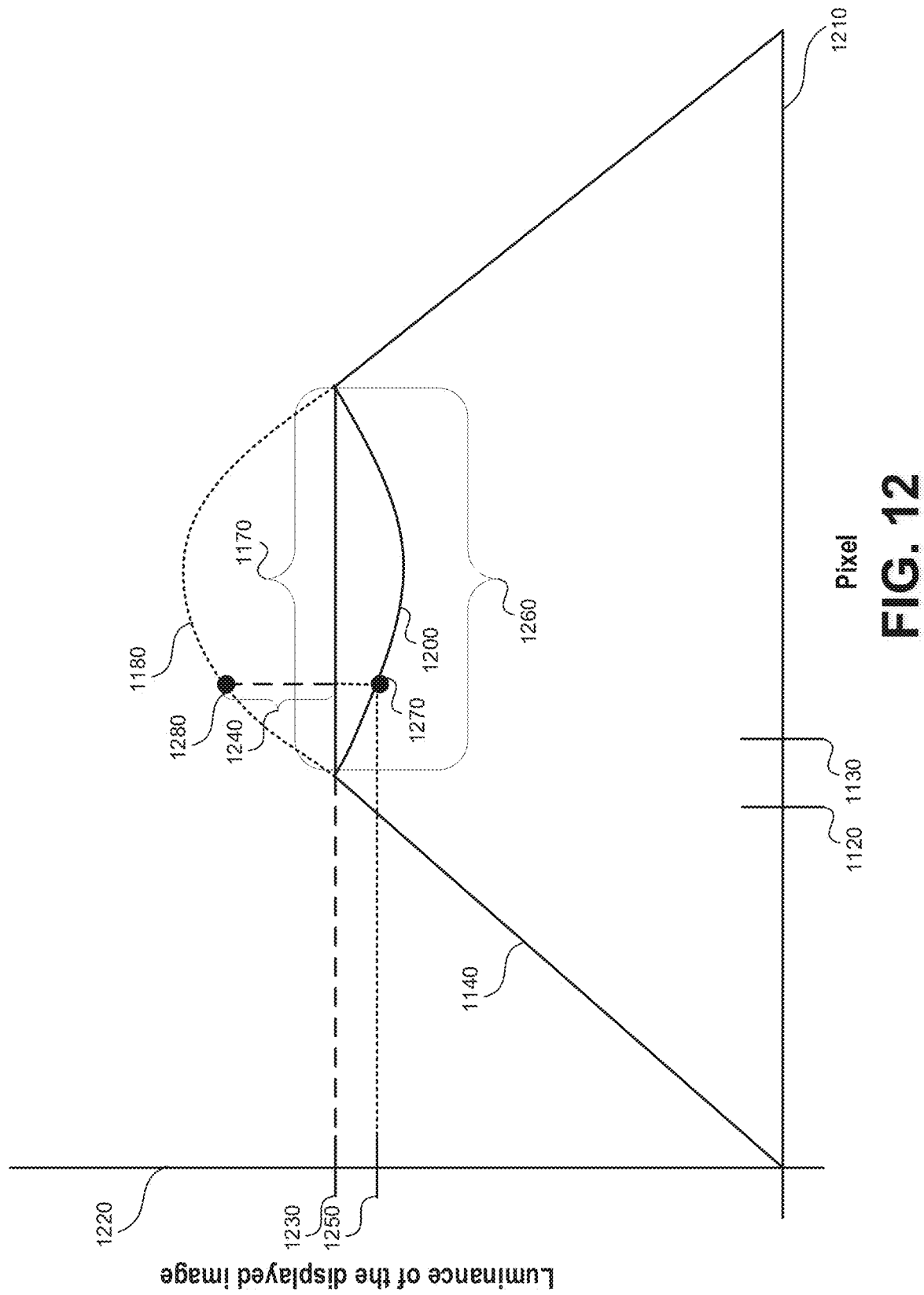
FIG. 12 shows a pattern unlikely to occur in the image and indicating true pixel value of the image, according to one embodiment.
Figure 13:
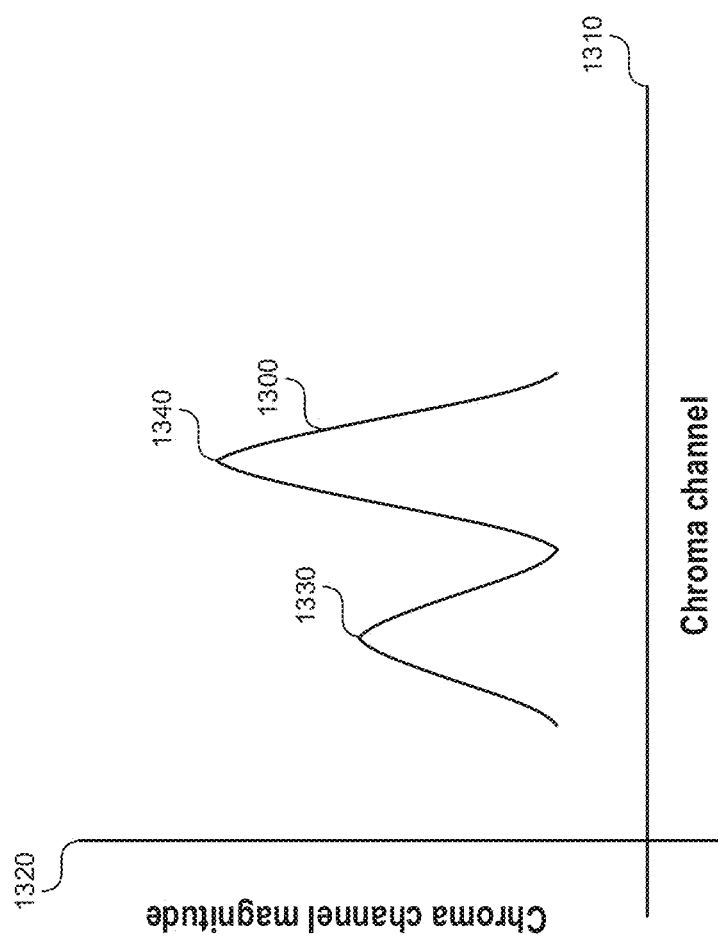
FIG. 13 shows a pattern unlikely to occur in the image and indicating true pixel value of the image, according to another implementation.

The pattern can be spatial pattern as shown in FIGS. 12 and 13, or a temporal pattern. To be a temporal pattern, the input image and a modified version of the input image can be displayed at a high frequency. The camera can be synchronized to record both the input image and the modified version of the input image. The difference between the input image and the modified version of the input image can indicate the regions and the original pixel value of the regions in the input image.

FIG. 12 shows a pattern unlikely to occur in the image and indicating true pixel value of the image, according to one embodiment. The graph 1200 shows inverse log encoding of region 1110 in FIG. 11. The X-axis 1210 represents a pixel in the image 1100, such as pixel 1120, 1130. The Y-axis 1220 represents the pixel value of the displayed image.

In one implementation, a processor performing preprocessing can obtain a threshold 1230 equal to or less than the threshold pixel value of the display 110. When a pixel value of a pixel in the image 1100 exceeds the threshold pixel value, the processor modifies the pixel value sent to the display 110.

To modify the pixel value, the processor determines a difference 1240 between the pixel value of the pixel and the threshold pixel value 1230. The processor applies a log function to the difference, thus decreasing the magnitude of the difference. The log function can be an inverse gamma, an inverse PQ function, an inverse HLG function, etc. The processor encodes the result of the log function as a negative offset from the threshold. For example, the processor can subtract the result of the log function from the threshold and provide the resulting pixel value 1250 to the display 110.

Consequently, instead of obtaining a plateau 1170, the true pixel value represented by the graph 1180 is represented using portion 1260 of the graph 1200. As can be seen, in FIG. 12, the magnitude of the pixel value 1270 (only one labeled for brevity) in the portion 1260 compared to the plateau 1170 is smaller than the magnitude of the corresponding pixel value 1280 (only one labeled for brevity) in the graph 1180. Reduction in magnitude is due to the log function applied to the difference 1240.

The graph 1200 with the modified portion 1260 is a pattern unlikely to occur in the image and signals the magnitude of the true pixel value. To reconstruct the true pixel value 1180, a processor performing postprocessing can detect the pattern represented by the graph 1200. Consequently, the processor can reverse the above steps, to obtain the true pixel value 1180. To detect the pattern, the processor can utilize a Fast Fourier Transform, cosine transform, Fourier transform, and/or machine learning, such as convolutional networks, to detect the pattern.

FIG. 13 shows a pattern unlikely to occur in the image and indicating the true pixel value of the image, according to another implementation. In addition to, or instead of, the method described in FIG. 12, a processor performing preprocessing can include a signature frequency 1300 to indicate that the image pixel value exceeds the display pixel value. The X-axis 1310 represents the chroma channel of the image. The chroma channel can include red, green, and blue, or cyan, yellow, magenta, and black, depending on the image format. The Y-axis 1320 represents the magnitude of the chroma channel. When the magnitude of the chroma channel of neighboring pixels is plotted, the signature frequency 1300 emerges.

The processor can obtain a threshold 1230 equal to or less than the maximum pixel value of the display 110. When a pixel value of a pixel in the image 1100 exceeds the threshold pixel value, the processor modifies the image sent to the display 110. Since most regions having high pixel value tend to be white, the processor can encode the signature frequency 1300 in the chroma channels. For example, in the region 1110 in FIG. 11, in which the pixel value of the image exceeds the maximum pixel value that the display can present, the processor can encode the signature frequency 1300 in the chroma channels. The magnitude of the signature frequency 1300 can indicate the difference between the pixel value of the input image and the threshold, or can indicate the magnitude of the pixel value of the input image. Alternatively, the magnitude of the signature frequency 1300 can indicate the difference between the pixel value of the input image and the maximum pixel value of the display.

The signature frequency 1300 is unlikely to occur in the image 1100. The magnitude of the signature frequency 1300 can indicate the brightness of the region 1110. For example, the difference between the magnitude of the two peaks 1330, 1340 can indicate the brightness of the region 1110. A processor performing postprocessing can detect the signature frequency using a Fast Fourier Transform or a trained machine learning model. Based on the magnitude of the signature frequency, the processor can determine the original pixel value of the image 1100.

Figure 14A:
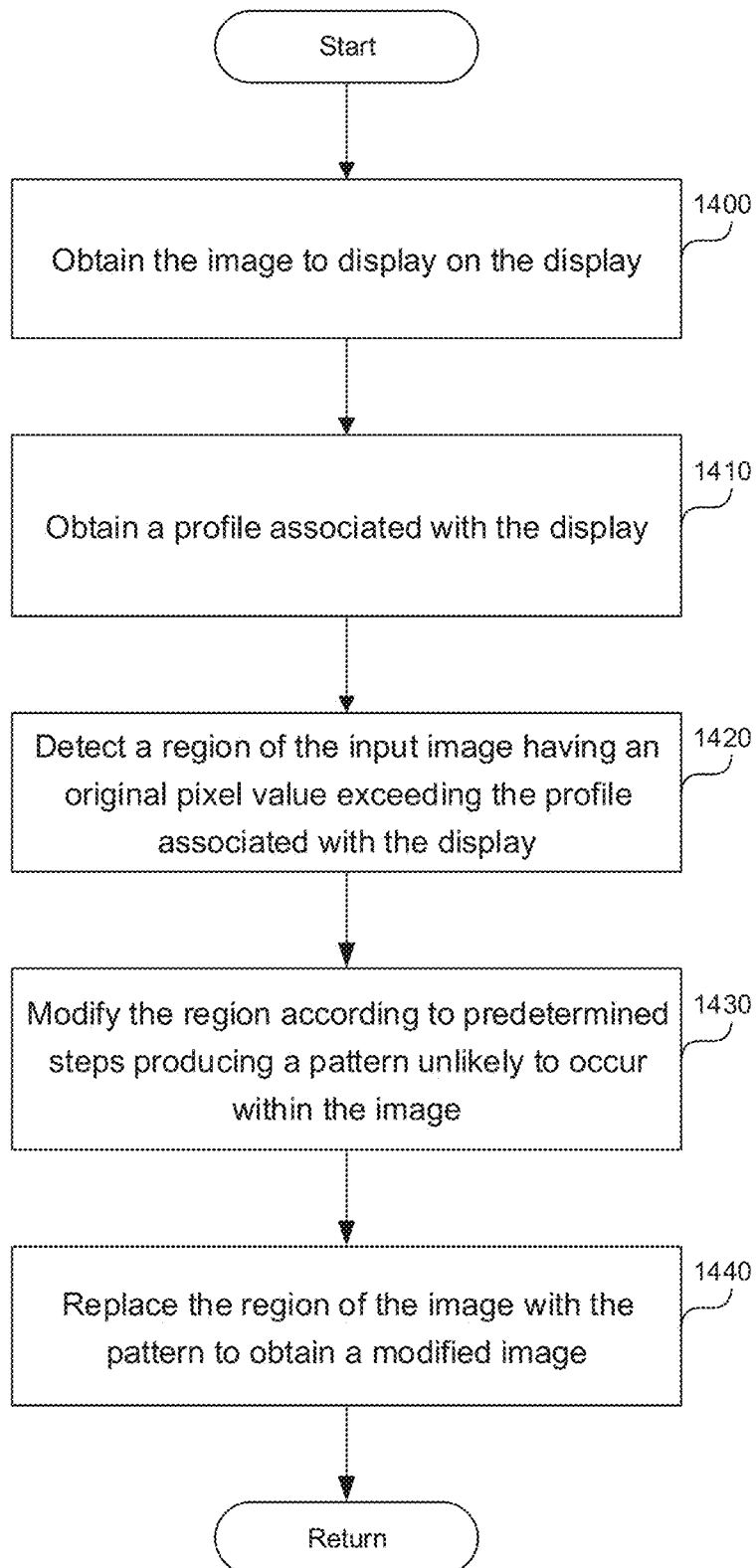
FIGS. 14A-14B show a flowchart of a method to increase dynamic range of an image recorded from a display, according to another technique.
Figure 14B:
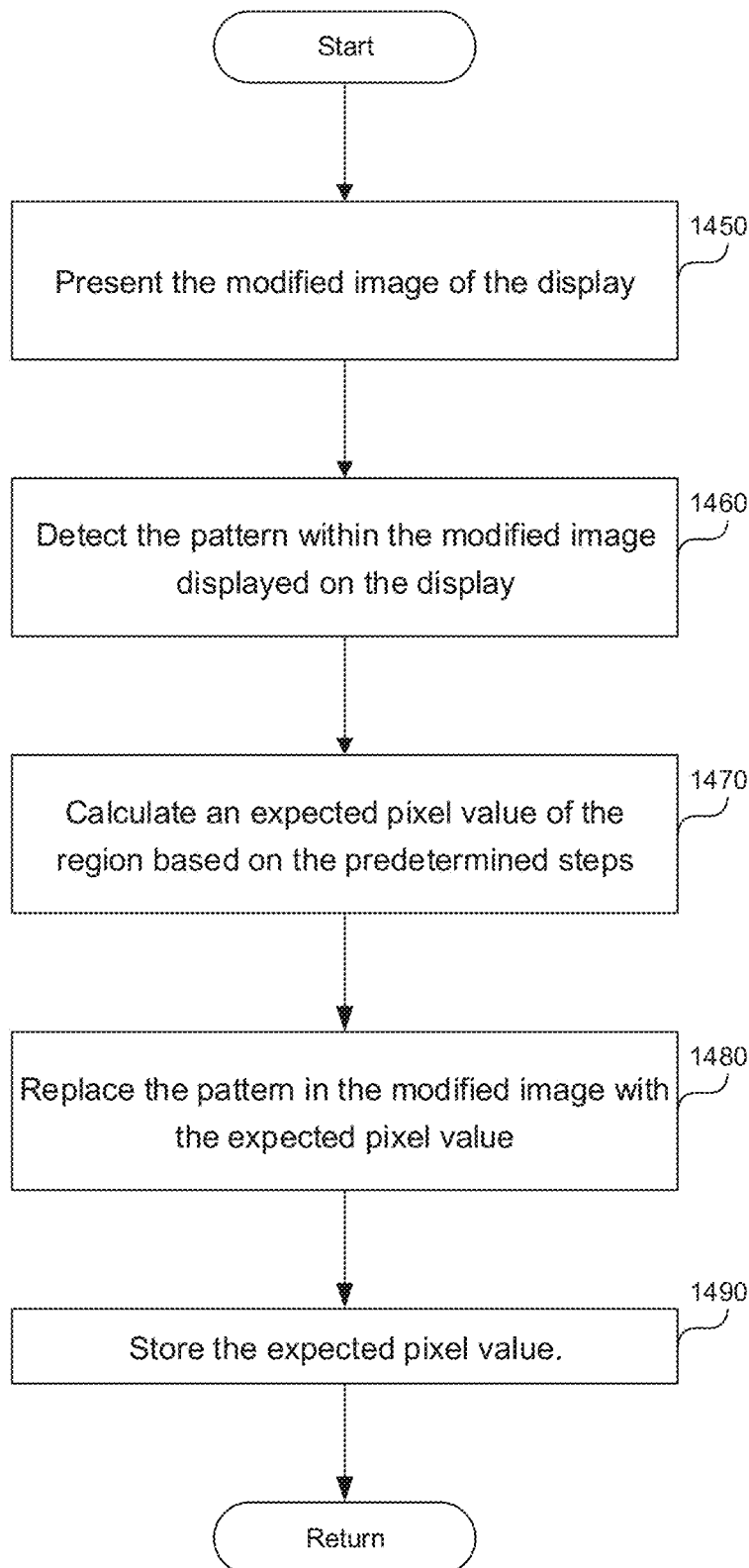

FIGS. 14A-14B show a flowchart of a method to increase dynamic range of an image recorded from a display, according to another technique. In step 1400, a hardware or software processor executing instructions described in this application can obtain the image to display on the virtual production display.

In step 1410, the processor can obtain a profile associated with the display, where the profile associated with display indicates a region of the display and a range of pixel values that the region of the display can present. A pixel value is a set of numbers defining hue, saturation and intensity. The pixel value can be an RGB tuple. To obtain the profile, the processor can obtain a threshold between the first pixel value of the virtual production display and the second pixel value of the virtual production display. The second pixel value can be higher than the first pixel value. The first pixel value can be the minimum pixel value the display can present, while the second pixel value can be the maximum pixel value the display can present. The minimum and maximum pixel value the display can present can vary depending on what is already presented on the display. For example, the display can be limited by a total amount of power the display can draw. If there is a large swath of the display that needs to be at high luminance, the maximum pixel value at any one point of the display can be reduced compared to when only a small portion of the display needs to be at high luminance.

The first pixel value and the second pixel value indicate a dynamic range of the virtual production display. The threshold can be higher than the average of the first pixel value and the second pixel value. For example, the threshold can be a weighted average of the first pixel value and the second pixel value, where the second pixel value has a weight higher than 0.5, and the first pixel value has a weight of (1−the weight of the second pixel value). In another example, the threshold can be the second pixel value of the virtual production display. In a third example, the threshold can be 80% of the second pixel value.

In step 1420, the processor can detect a region of the image having an original pixel value exceeding the profile, e.g. dynamic range, associated with the display. A region can be a pixel or a group of pixels in the image. If the region is a single pixel, the pixel value of the region is the pixel value of the pixel. If the region contains multiple pixels, the pixel value of the region can be a function of the pixel value of each pixel contained in the region. The function can be an average or can be a weighted function. The weighted function can add more weight to the pixel value of pixels in the middle of the region, and less weight to the pixel value of the pixels on the periphery of the region.

In step 1430, the processor can modify the region according to predetermined steps producing a pattern unlikely to occur within the image. The pattern can correspond to the original pixel value. The pattern can correspond to a difference between the original pixel value and the threshold. For example, the magnitude of the pattern can indicate the magnitude of the difference between the pixel value of the pixel and the threshold. The pattern can be a spatial or a temporal pattern.

In one implementation, when the original pixel value exceeds the profile associated with the display, to modify the region, the processor can obtain a difference between the original pixel value and the threshold. The processor can apply a function to the difference to obtain a modified difference, wherein the function reduces a magnitude of the difference. The function can be a logarithmic function. The processor can multiply the modified difference by a negative number, such as negative one. Upon multiplying, the processor can include the modified difference in the pattern, thus obtaining a graph similar to graph 1200 in FIG. 12.

In another implementation, when the original pixel value exceeds the profile associated with the display, to modify the region, the processor can determine a magnitude of the original pixel value. The processor can obtain a signature frequency indicating that the original pixel value exceeds the threshold. For example, the signature frequency can be stored in a lookup table the processor can access. The processor can modify a magnitude of the signature frequency to indicate the magnitude of the original pixel value. Finally, the processor can encode the modified signature frequency into the channel that exceeds the threshold, the processor can modify all channels in the same manner when one of the channels exceeds the threshold, or the processor can modify a chroma channel of the image. A channel can be red, green, and blue in an RGB image, cyan, magenta, yellow and black in a CMYK image, etc. The pixels having a high pixel value tend to be white, and the chroma channels in high pixel value pixels do not carry important information. Therefore, the modifications of the chroma channel in high pixel value pixels tend to be unnoticed by an observer.

In a third implementation, to modify the region, when the pixel value exceeds the profile associated with the display, the processor can apply a function to the pixel value to obtain a modified pixel value, where the function reduces a magnitude of the pixel value. The processor can include the modified pixel value in the pattern.

In step 1440, the processor can replace the region of the image with the pattern to obtain a modified image. In step 1450, the processor can present the modified image of the virtual production display.

In step 1460, the processor can detect the pattern within the modified image displayed on the virtual production display. In one implementation, the processor can use a Fast Fourier Transform to detect the pattern within the modified image. In another implementation, the processor can use a machine learning model to detect the pattern within the modified image. The machine learning model can be a convolutional neural network.

In step 1470, the processor can calculate an expected pixel value of the region based on the predetermined steps, for example, by reversing the predetermined steps. The expected pixel value is a recording of the pixel value presented on the display.

In step 1480, the processor can replace the pattern in the modified image with the expected pixel value. In step 1490, the processor can store the original pixel value.

The processor can calibrate the display. To calibrate the display, the processor can obtain a first pixel value of a virtual production display region. The processor can obtain a second pixel value of an image region shown in the virtual production display region. The processor can determine a difference between the first pixel value and the second pixel value. Based on the difference between the first pixel value and the second pixel value, the processor can obtain a calibration function correlating the first pixel value and the second pixel value. To obtain the calibration function, the processor can have multiple first pixel values and multiple second pixel values through which to fit a function. The processor can record the modified image from the virtual production display to obtain a recorded image. The processor can determine a region in the recorded image corresponding to the virtual production display region. The processor can increase the pixel value of the first recorded image by applying the function to the pixel value of the region in the recorded image corresponding to the virtual production display region.

The processor can calibrate the camera to determine how the pattern occurs in the recorded image. To calibrate the camera, the processor can record the pattern from the display. The processor can determine a signature pixel value of the recorded pattern, and can store the signature pixel value of the recorded pattern to use in detecting the pattern within the modified image presented on the display. The processor can also calibrate the threshold 1230 in FIG. 12 to determine the pixel value of the threshold in the recorded image.

When the image is being presented on the display, the processor can preserve the average pixel value of a third region of the image, where the third region includes the region and a second region surrounding the region. The reason to preserve the average pixel value of the third, bigger, region is to provide appropriate lighting to the actors and props within the virtual production set. Once the camera records the modified image, the processor associated with the camera can increase the pixel value of the region, while decreasing the pixel value of the second region. To accomplish this task, the processor can determine the second region surrounding the region. The processor can increase pixel value of the second region to obtain an increased pixel value, where the increase in the pixel value of the second region corresponds to a decrease in pixel value of the region. Thereby, the processor preserves the average pixel value of the third region. The processor can include the increased pixel value and a second pattern to indicate the increase in the pixel value of the second region in the modified image. The processor can present the modified image on the display. The camera can record the modified image. The processor can detect the second pattern within the modified image presented on the display. The processor can calculate a second expected pixel value of the second region, where the second expected pixel value is lower than the pixel value of the second region. Finally, the processor can replace the second pattern in the modified image with the second expected pixel value.

The processor can train a machine learning model to detect a discrepancy between a first image and a second image, where the first image excludes the pattern, and the second image includes the first image modified with the pattern. The processor can use the machine learning model to detect the pattern within the image.

The processor can adjust the pattern to include in the modified image, based on the input image. The processor can analyze the input image to determine the pattern unlikely to occur within the image, where the pattern substantially preserves appearance of the input image. To substantially preserve the appearance of the input image, the processor can confine the modifications to the image to be within 30% of the original color, or 30% of the original pixel value of the input image. To determine the pattern to include in the modified image, the processor can use machine learning to analyze the image and determine the pattern that is least disruptive to the input image.

The processor can create the pattern unlikely to occur within the input image. The pattern can indicate the region to be modified, a method used to modify the input image, and the expected pixel value of the region.

To determine which of the brightness increasing techniques described in this application to apply, the processor can obtain an input indicating a technique among multiple techniques, where the technique is configured to increase dynamic range of an image recorded from a virtual production display. The input can be specified through a dial in both the preprocessing components and the postprocessing components, or the input can be wirelessly communicated between the preprocessing components and the postprocessing components. Alternatively, the input can be communicated through the image, or through a synchronization image presented prior to presenting the input image on the virtual production display. The processor performing preprocessing can apply a first portion of the technique to the image prior to displaying the image on the virtual production display. The processor performing postprocessing can apply a second portion of the technique to an image recorded from the virtual production display. The first portion and the second portion of the technique can be inverses of each other.

Once the image is recorded, the processor associated with the camera can reverse the steps performed by the processor associated with the display. To calculate the expected pixel value of the recorded image, the processor can obtain the pattern to detect. Based on the pattern, the processor can obtain a function to apply to the modified region. The function can the inverse of the function applied to the image to generate the pattern. For example, the function can include multiplying the modified region, such as region 1200 in FIG. 12 by a negative number and calculating an exponent of the pixel values in the region 1200, to obtain the original pixel value 1180 in FIG. 12.

Similarly, the processor can obtain a signature frequency to detect, such as frequency 1300 in FIG. 13. The processor can detect the signature frequency indicating the modified region. The processor can determine a magnitude of the signature frequency, where the magnitude of the signature frequency indicates the expected pixel value. For example, the difference between the two peaks 1330, 1340 in FIG. 13 can indicate the magnitude of the expected pixel value. Based on the magnitude of the signature frequency, the processor can modify a pixel value of the modified region to obtain the expected pixel value.

IV. Increasing Dynamic Range of a Virtual Production Display Using Metadata

Figure 15:
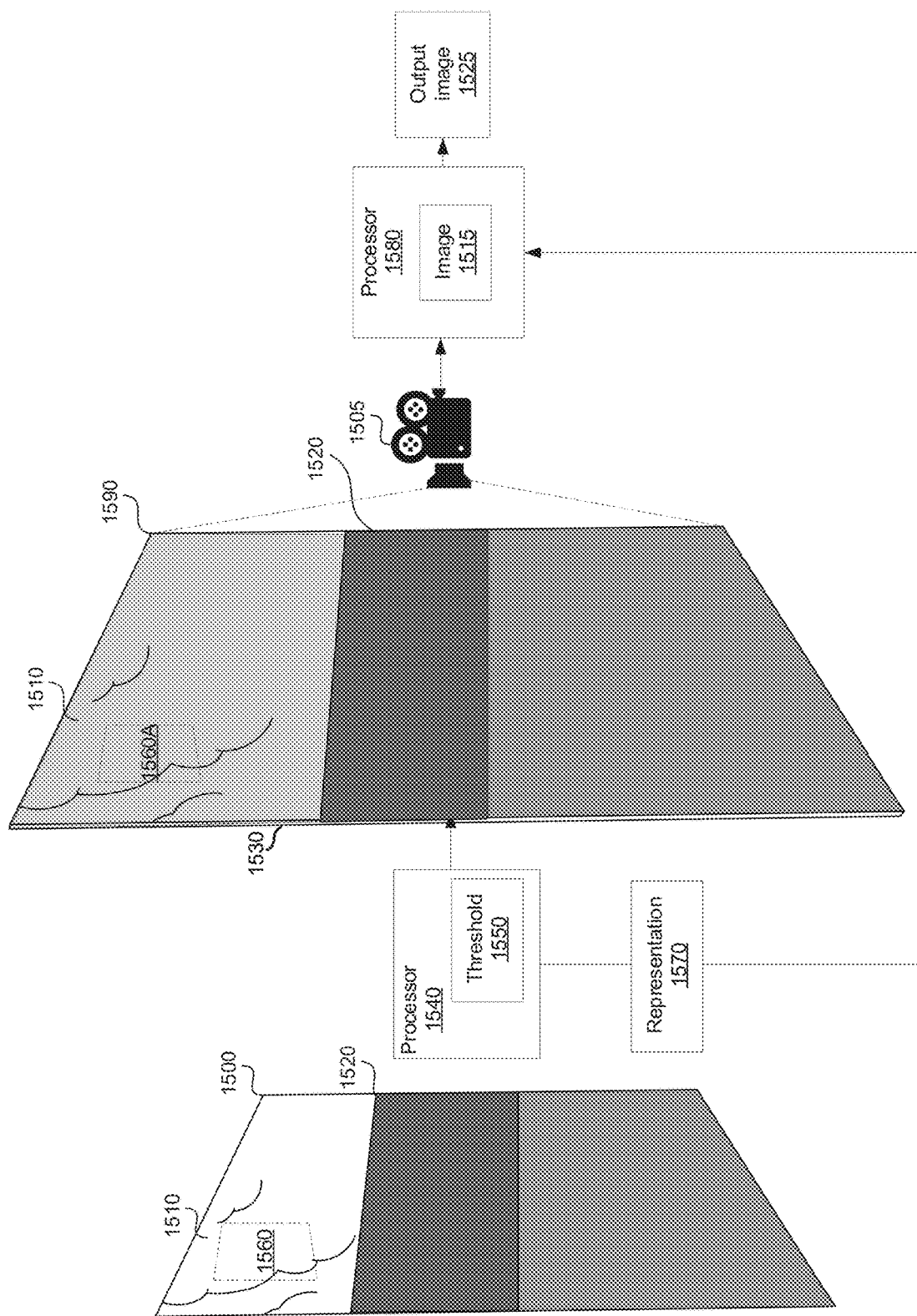
FIG. 15 shows a system to increase dynamic range of an image recorded from a virtual production display, according to another implementation.

FIG. 15 shows a system to increase dynamic range of an image recorded from a virtual production display, according to another implementation. An input image 1500 can include a region 1510 of high pixel value, and a region 1520 of low pixel value. The display 1530 has a limited range of pixel values, such as between 0 and 100, where 0 can be the first pixel value of the display, and 100 can be the second pixel value of the display. The second pixel value can be higher than the first pixel value. The first pixel value can be the minimum pixel value, while the second pixel value can be the maximum pixel value. The region 1510 of high pixel value can have pixel value in the range 101-200, while the region 1520 of low pixel value can have pixel value in the range 0-100.

To preserve the veracity of the high pixel value region 1510, a processor 1540 performing preprocessing can obtain a threshold 1550 between a minimum and a second pixel value of the display 1530. The threshold is greater than the first pixel value of the display 1530 and can be equal to the second pixel value of the display. The processor 1540 can compare the pixel value of regions 1560 (only one labeled for brevity) of the input image 1500 against the threshold. The region 1560 can be a pixel or the region can be a group of pixels, such as a group of neighboring pixels. When the region 1560 includes a group of pixels, to compute the pixel value of the region 1560, the processor can compute an average of each pixel's pixel value, or the processor can compute a weighted average of each pixel's pixel value. For example, pixels in the center of the region 1560 can have a higher weight than the pixels on the periphery.

When the pixel value of a region 1560 exceeds the threshold 1550, the processor can record an indication of the region's pixel value and an indication of the region in a representation 1570 of the input image 1500. The indication of the region's pixel value can be the original pixel value of the region 1560, or a difference between the threshold and the original pixel value of the region 1560. The indication of the region 1560 can be a location of the region in the input image 1500. For example, if the region 1560 is a pixel, the location of the region can be the pixel coordinates in the input image 1500. If the region 1560 is a group of pixels, the location can be the pixel coordinates of the central pixel in the group of pixels as well as the width and height of the region.

The representation 1570 occupies less memory than the input image 1500 because the representation 1570 is compact. While the input image 1500 contains at least three color values for each pixel, the representation 1570 can contain only one value, namely pixel value, and only for regions 1560 whose pixel value exceeds the threshold 1550. Consequently, the representation 1570 is sparse compared to the input image 1500 and can be efficiently communicated between the processor 1540 performing preprocessing, and a processor 1580 performing postprocessing.

Once the processor 1540 analyzes the input image 1500 and creates the representation 1570 indicating regions 1560 exceeding the threshold pixel value in the input image, the processor can cause the display 1530 to present an image 1590 corresponding to the input image 1500, but where the pixel value regions exceeding the second pixel value of the display are clipped. For example, if the pixel value of the region 1560 is 153, while the second pixel value of the display 1530 is 100, the image 1590 presents the pixel value of the region 1560A as 100.

The camera 1505 can record the image 1590 to obtain recorded image 1515, in which the pixel value of the region 1560 is represented as 100. The processor 1580 can obtain the recorded image 1515 and the representation 1570 via a wired or a wireless network connecting processors 1540 and 1580.

From the representation 1570, the processor 1580 can retrieve the indication of the pixel value of the region 1560 and the indication of the region. Based on the indication of the pixel value of the region 1560, the processor 1580 can calculate the region's original pixel value. Based on the indication of the region, the processor 1580 can identify the region 1560 and can replace the pixel value of the region 1560 with the newly calculated pixel value to obtain the output image 1525, as explained below. The output image 1525 can be an exact match or a close approximation of the input image 1500.

Figure 16:
FIG. 16 shows a correspondence between an input image and a recorded image.

FIG. 16 shows a correspondence between an input image and a recorded image. The camera 1505 in FIG. 15 can record the input image 1600 to produce the recorded image 1610. The input image 1600 can include pixels 1600A, 1600B, 1600C, 1600D, while the recorded image can include pixels 1610A, 1610B, 1610C, 1610D. Due to the blur of the camera 1505 lens, the pixels 1610A, 1610B, 1610C, 1610D in the recorded image 1610 do not correspond exactly to the pixels 1600A, 1600B, 1600C, 1600D in the input image 1600.

For example, a camera lens blur can cause a pixel 1610A to be a weighted sum of pixels 1600A, 1600B, 1600C, 1600D. For example, pixel 1600A can have the highest influence, pixels 1600B, 1600C can have lower influence, while pixel 1600D can have the lowest influence. Consequently, pixel 1610A is lighter than pixel 1600A, but darker than pixel 1600B. The map between pixel 1610A and pixels 1600A, 1600B, 1600C, 1600D can be:

$$0.5*1600A+0.2*1600B+0.2*1600C+0.1*1600D. \quad (1)$$

To determine a correspondence between the input image 1600 and the recorded image 1610, the processor can calibrate the input image to the output image and determine the map (1). The map (1) can vary from pixel to pixel. For each pixel 1610A-D (only four labeled for brevity) in the recorded image 1610, the processor can determine the pixels 1600A-D (only four labeled for brevity) in the input image 1600 that contribute to the pixels 1610A-D. Further, the processor can determine the map, namely, the amount of contribution of each of the pixels 1600A-D to the pixel 1610A.

Once the processor determines the map (1), the processor can use the indication of the location and the indication of the pixel value in the representation 1570 in FIG. 15 to obtain the output image 1525 in FIG. 15.

Figure 17:
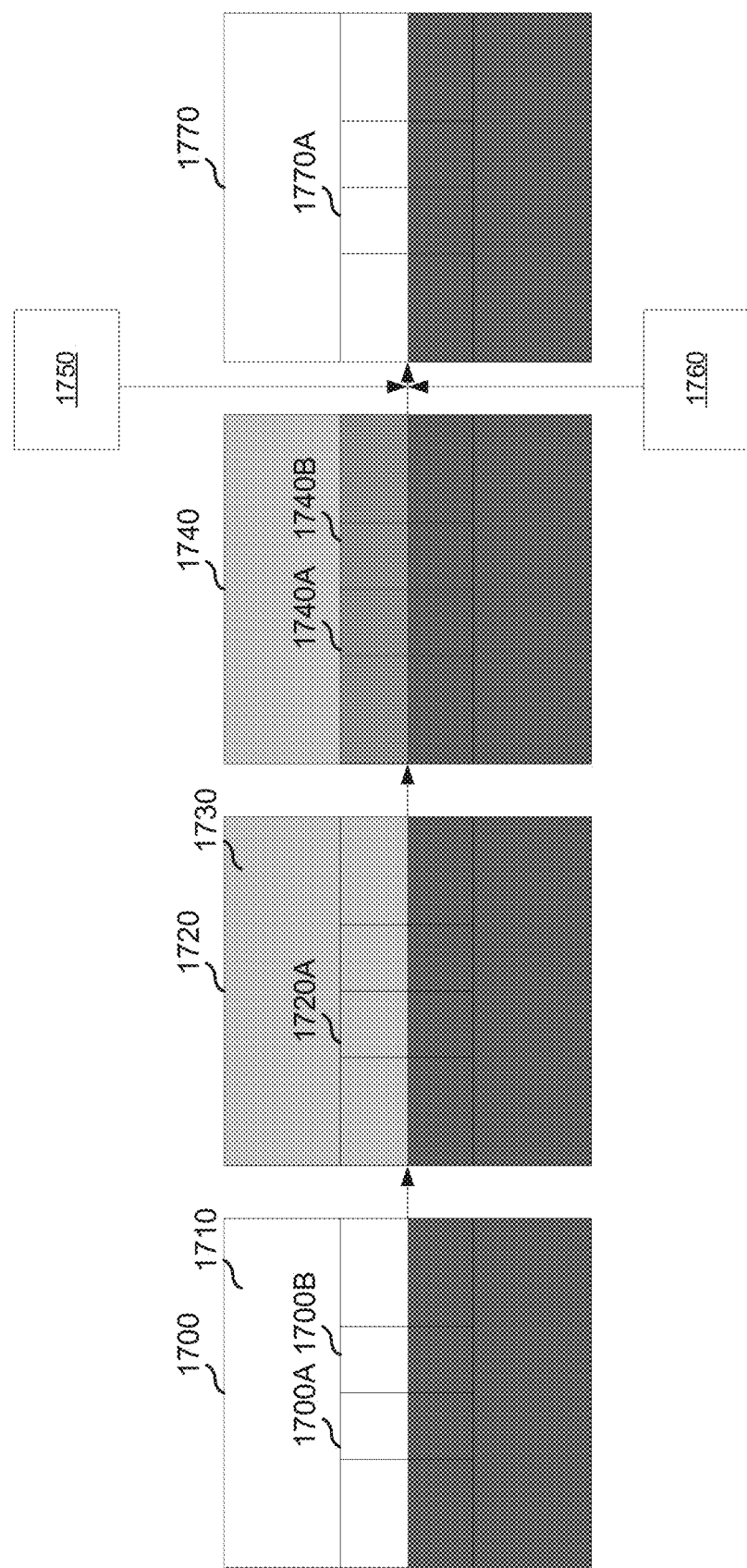
FIG. 17 shows a process to retrieve the original pixel value of the input image using a map and a representation of the input image.

FIG. 17 shows a process to retrieve the original pixel value of the input image using a map and a representation of the input image. The input image 1700 contains the region 1710 of high pixel value including pixels 1700A, 1700B that are clipped by the display. Presented image 1720 is the image presented on the display, where the region 1710 has a lower pixel value 1730. Recorded image 1740 is recorded by a camera, and contains blurred pixels 1740A, 1740B.

A processor can receive representation 1750 including an original pixel value and a location of clipped pixels 1700A, 1700B. In addition, the processor can obtain a map 1760 which indicates the pixels 1740A, 1740B whose pixel value is affected by clipped pixels 1700A, 1700B. Further, the map 1760 indicates by how much pixels 1700A, 1700B affect the pixel value of pixels 1740A, 1740B.

For example, the map can indicate that pixel 1700A affects the pixel value of pixel 1740A by a factor of 0.5. In one implementation, the processor can assume that the pixel value of the pixel 1720A, corresponding to the clipped pixel 1700A, is clipped to the maximum value of the display. Consequently, the processor can increase the pixel value of the pixel 1740A by:

$$\text{(original pixel value of pixel } 1710A-\text{maximum pixel value of the display)}*0.5. \quad (2)$$

to obtain pixel 1770A in the output image 1770. In another implementation, the processor can obtain the pixel value of the presented pixel 1720A by, for example, obtaining a power provided to the pixel 1720A. Consequently, the processor can increase the pixel value of the pixel 1740A by:

$$\text{(original pixel value of pixel } 1710A-\text{pixel value of the presented pixel } 1720A)*0.5. \quad (3)$$

to obtain pixel 1770A in the output image 1770. The processor can perform the adjustment for every pixel in the recorded image 1740 that is affected by a pixel contained in the representation 1750 to obtain the output image 1770.

Figure 18:
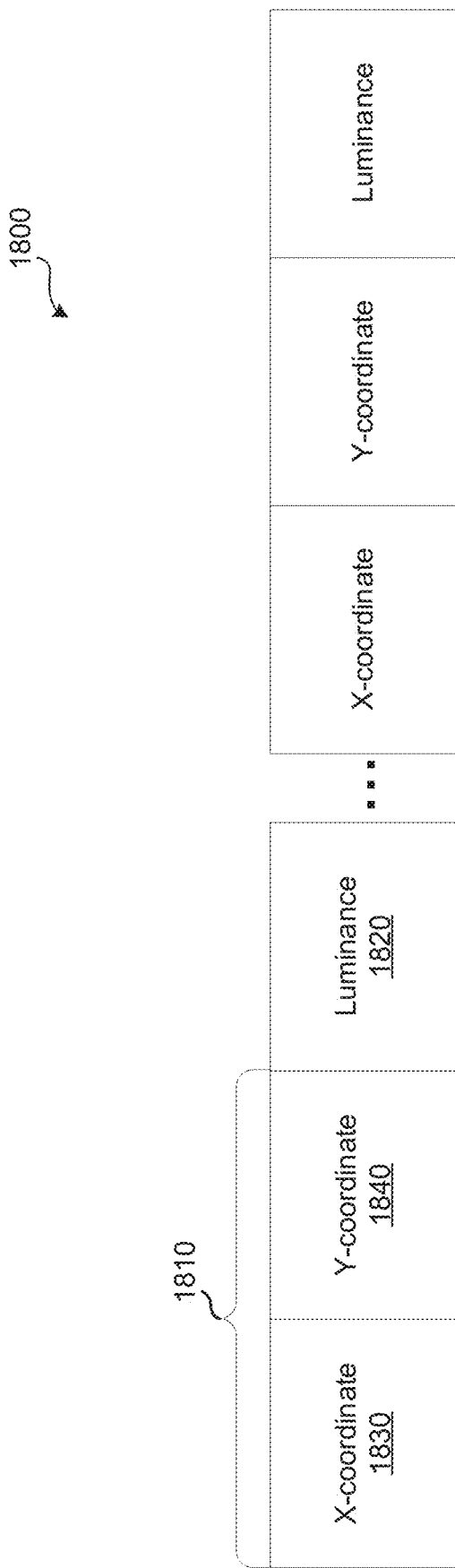
FIG. 18 shows a representation of the input image.

FIG. 18 shows a representation of the input image. The representation 1800 of the input image can include an indication of the region 1810 of the input image and an indication of the original pixel value 1820 of the region. The indication of the region 1810 can include X-coordinate 1830 and Y-coordinate 1840 of the bright pixel, such as 1053, 546. The indication of the original pixel value 1820 can include the original pixel values such as 196.5. To represent all the bright pixels in the input image, the representation 1800 can contain multiple sets of three numbers for each bright pixel.

Figure 19:
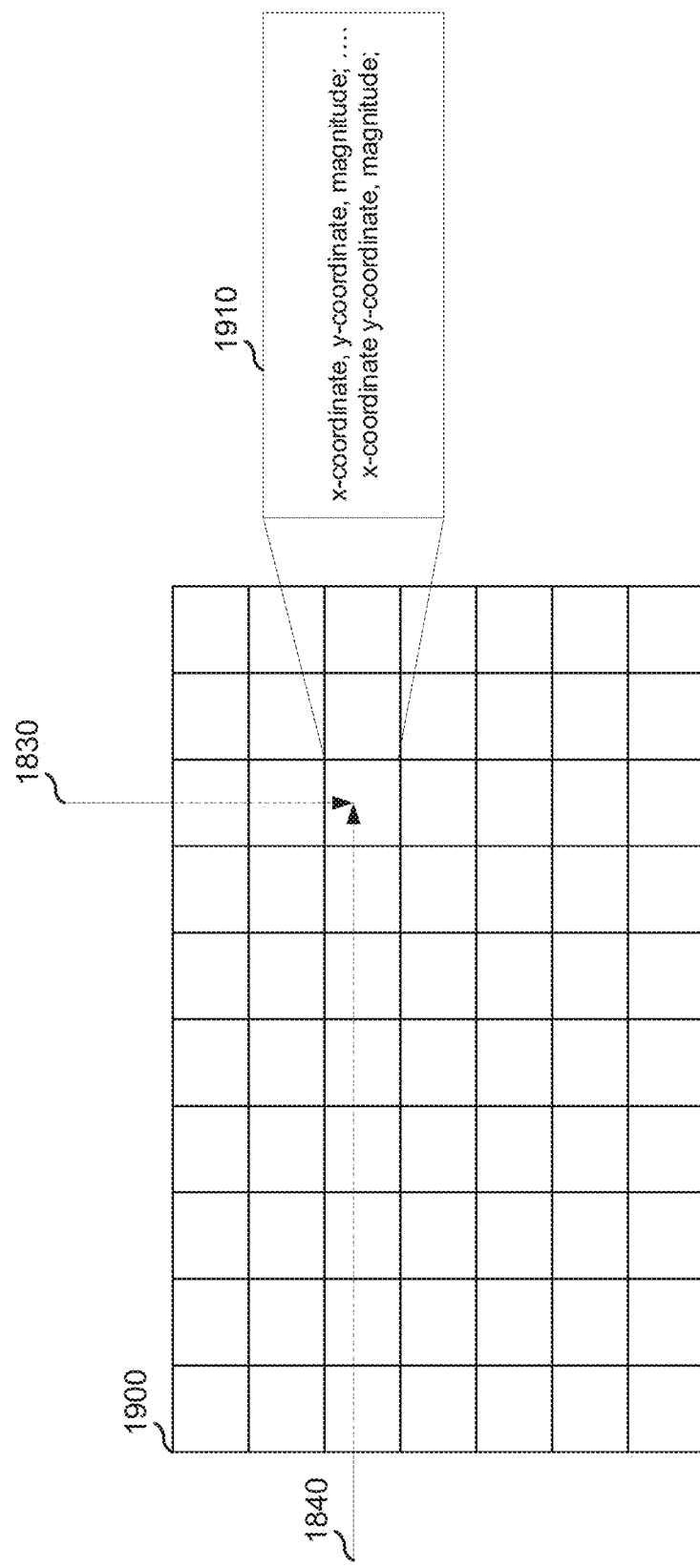
FIG. 19 shows a map between a pixel in the representation of the input image, and a pixel in a recorded image.

FIG. 19 shows a map 1900 between a pixel in the representation 1800 in FIG. 18, and a pixel in a recorded image. The map 1900 can be the map 1760 in FIG. 17. The map 1900 can be a two-dimensional data structure, such as an array, that can take as input the indication of the region 1830, 1840 in FIG. 18 and produce as output a list of pixels affected by the region 1810, and the magnitude of the influence of the region 1810 on each pixel in the list of pixels.

For example, the region 1810 influences the pixels in the list 1910. The list 1910 identifies each pixel influenced by, for example, coordinates of the pixel, and shows the magnitude of the influence of the region 1810 on each pixel. The list 1910 can include a 3-tuple indicating the location of the pixel as well as the magnitude of influence. The magnitude of influence can be used in the calculations (2) and (3) as described in this application and can be greater than 0 and less than or equal to 1.

Figure 20A:
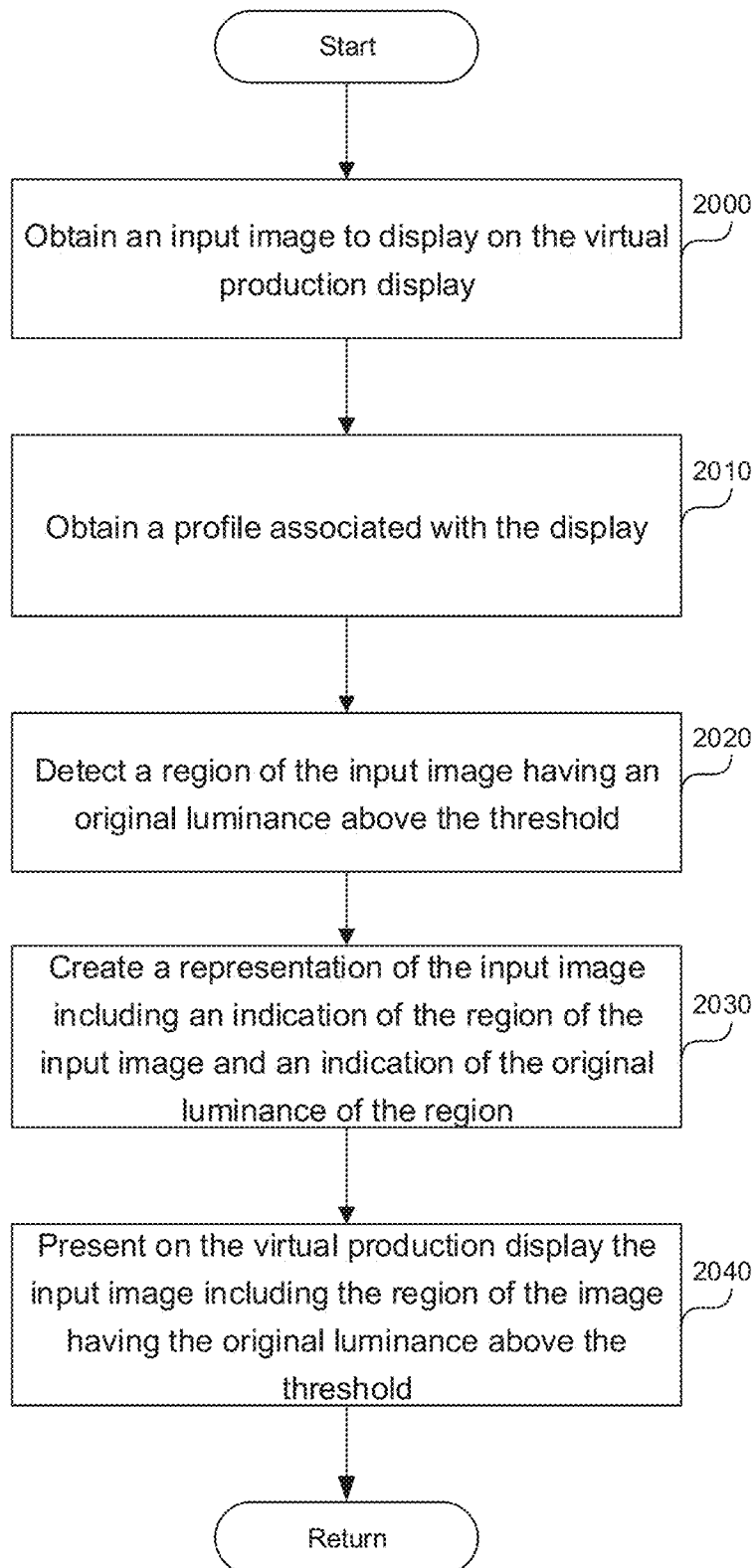
FIGS. 20A-20B show a flowchart of a method to increase dynamic range of an image recorded from a display, according to another technique.
Figure 20B:
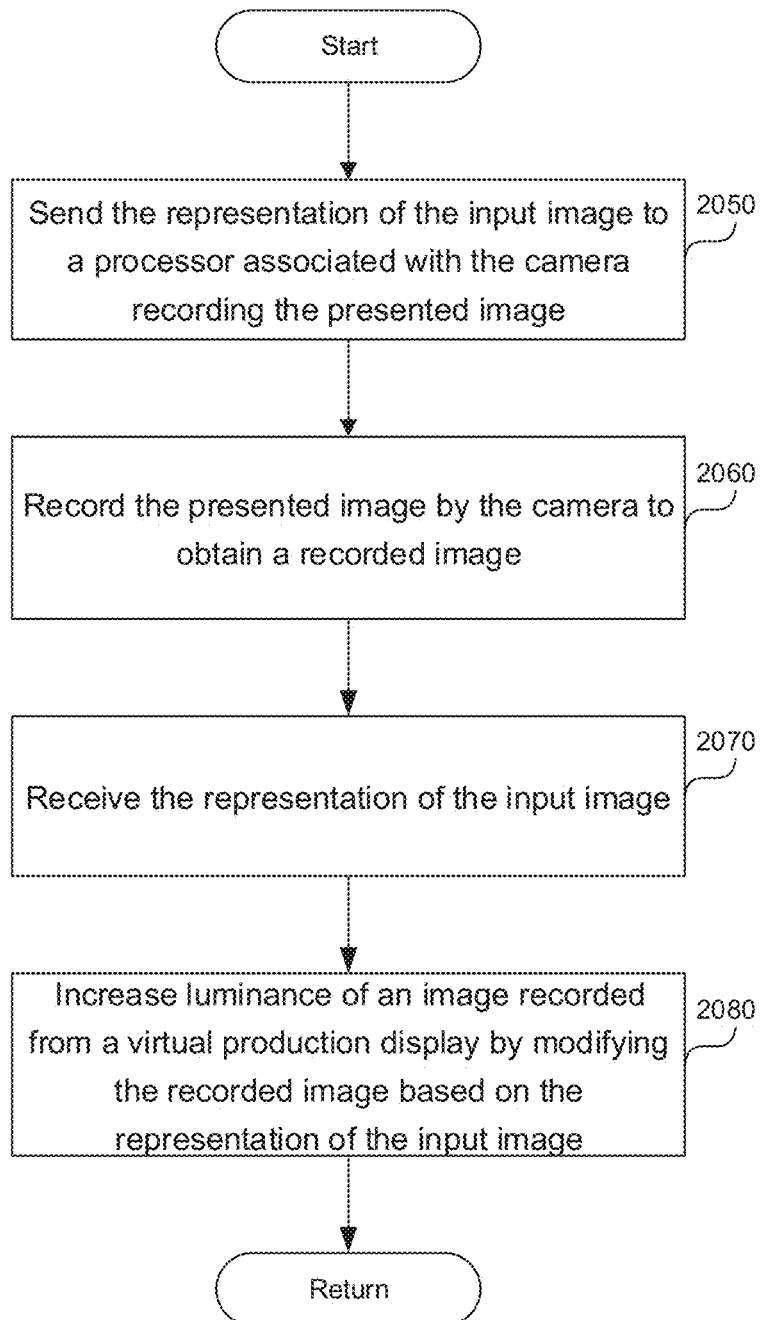

FIGS. 20A-20B show a flowchart of a method to increase dynamic range of an image recorded from a display, according to another technique. In step 2000, a processor can obtain an input image to display on the virtual production display. The input image, as used in this specification, can be a description of a scene to display represented in any color space such as RGB, CMYK. The input image, is using the specification, can be a description of a scene to display represented using spectral data, namely, an indication of a particular electromagnetic wavelength and an indication of intensity at the particular electromagnetic wavelength. To convert the spectral data into a color space, the processor can integrate the intensities at the appropriate wavelengths to obtain intensity of a color used in a color space.

In step 2010, the processor can obtain a profile associated with the display. The profile associated with display indicates a region of the display and a range of pixel values that the region of the display can present. A pixel value is a set of numbers defining hue, saturation and intensity. The profile can include a threshold between a first pixel value of the virtual production display and a second pixel value of the virtual production display. The second pixel value can be higher than the first pixel value. The first pixel value can be the minimum pixel value, while the second pixel value can be the maximum pixel value. The first pixel value and the second pixel value indicate a dynamic range of the virtual production display. The threshold can be higher than the average of the first pixel value and the second pixel value. For example, the threshold can be a weighted average of the first pixel value and the second pixel value, where the second pixel value has a weight higher than 0.5, and the first pixel value has a weight of (1−the weight of the second pixel value). In another example, the threshold can be the second pixel value of the virtual production display. In a third example, the threshold can be 80% of the second pixel value.

In step 2020, the processor can detect a region of the input image having an original pixel value exceeding the profile associated with the display, such as is exceeded the threshold included in the profile. A region can be a pixel or a group of pixels in the image. If the region is a single pixel, the pixel value of the region is the pixel value of the pixel. If the region contains multiple pixels, the pixel value of the region can be a function of pixel value of each pixel contained in the region. The function can be an average or can be a weighted function. The weighted function can add more weight to the pixel value of the pixels in the middle of the region, and less weight to the pixel value of the pixels on the periphery of the region.

In step 2030, the processor can create a representation of the input image including an indication of the region of the input image and an indication of the original pixel value of the region. The representation of the input image can be a data structure as explained in FIG. 18. The representation of the input image occupies less memory than the input image. To create the representation of the input image, the processor can store a location of the region of the input image and the indication of the original pixel value of the region in the representation of the input image.

In step 2040, the processor can present on the virtual production display the input image including the region of the image having the original pixel value original pixel value exceeding the profile associated with the display. The original pixel value of the region in the presented image can be clipped, that is, presented at a lower pixel value than the original pixel value.

In step 2050, the processor can send the representation of the input image to a processor associated with the camera recording the presented image. The processor can send the representation of the input image via a channel independent of the display, such as a wired or a wireless network.

In step 2060, the processor can record the presented image by the camera to obtain a recorded image. In step 2070, the processor can receive the representation of the input image.

In step 2080, the processor can increase dynamic range of the recorded image by modifying the recorded image based on the representation of the input image to obtain an output image. The output image can closely approximate, or exactly match, the pixel value of the input image. For example, if the pixel value of the output image closely approximates the pixel value of the input image, the pixel value of the output image can be ±20% of the pixel value of the original image. To modify the recorded image, the processor can retrieve from the representation of the input image the first location and the indication of the original pixel value of the region. Based on the map and the first location, the processor can determine the second location. Based on the map and the indication of the original pixel value of the region, the processor can determine the second pixel value as explained in this application, for example in FIG. 19. The processor can replace a pixel value at the second location of the recorded image with the second pixel value.

When the camera is moving, or when the camera is viewing the display at an angle, the processor can take into account the relative position and relative orientation between the display and the camera to increase the dynamic range of the recorded image. The processor can obtain a relative position and a relative orientation between the display and the camera. Based on the relative position and the relative orientation between the display and the camera, the processor can modify the recorded image using the representation of the input image to obtain the output image.

The processor can distinguish between the display and props and actors placed in front of the display, invisible to the camera. The processor can preserve the props and acceptors placed in front of the display in the recorded image. Specifically, the processor can identify a region associated with the recorded image and indicating an object, e.g. props and actors, disposed between the display and the camera. The processor can preserve the region associated with the recorded image even if a portion of the region is included in the representation of the input image.

The processor can perform various calibrations. For example, the processor can calibrate the camera, and/or the processor can calibrate the virtual production display.

To calibrate the camera, the processor can obtain a first pixel value of a first region in the input image, and a second pixel value of a second region in the recorded image corresponding to the first region. The processor can determine a difference between the first pixel value and the second pixel value. Based on the difference between the first pixel value and the second pixel value, the processor can obtain a map. As explained in this application, for example in FIG. 19, the map can correlate the first pixel value and the second pixel value and a first location of the region associated with the first pixel value, and a second location of the region associated with the second pixel value.

To calibrate the display, the processor can display various images, as explained in this application, for example in FIGS. 5A-5B. The display can be split into panels, where each panel is a separate power source, thus increasing the brightness of the display. Each panel can be calibrated independently. The processor can obtain, e.g., measure, a first pixel value of a virtual production display region, and a second pixel value of an input image region shown in the virtual production display region. The processor can determine a difference between the first pixel value and the second pixel value. There can be multiple sets of first pixel value and second pixel value, for the processor to be able to fit a curve. Based on the difference between the first pixel value and the second pixel value, the processor can obtain a function correlating the first pixel value and the second pixel value. The processor can determine a region in the recorded image corresponding to the virtual production display region. The processor can increase the pixel value of the recorded image by applying the function to a pixel value of the region in the recorded image corresponding to the virtual production display region.

To determine which of the brightness increasing techniques described in this application to apply, the processor can obtain an input indicating a technique among multiple techniques, where the technique is configured to increase dynamic range of an image recorded from a virtual production display. The input can be specified through a dial in both the preprocessing components and the postprocessing components, or the input can be wirelessly communicated between the preprocessing components and the postprocessing components. Alternatively, the input can be communicated through the image, or through a synchronization image presented prior to presenting the input image on the virtual production display. The processor performing preprocessing can apply a first portion of the technique to the image prior to displaying the image on the virtual production display. The processor performing postprocessing can apply a second portion of the technique to an image recorded from the virtual production display. The first portion and the second portion of the technique can be inverses of each other.

The processor can generate a unique identifier associated with the presented image and a time indicating when the input image is presented on the display. The processor can enable the camera to determine the presented image based on the unique identifier and the time indicating when the input image is presented on display, by sending to the camera the unique identifier and the time indicating when the input image is presented on the display. The processor can include an indication associated with the unique identifier and the time in the representation. The processor can obtain a relative position and a relative orientation between the display and the camera. The processor can include the relative position and the relative orientation in the representation.

Calibrating an Interaction Between a Display and a Camera

Figure 21A:
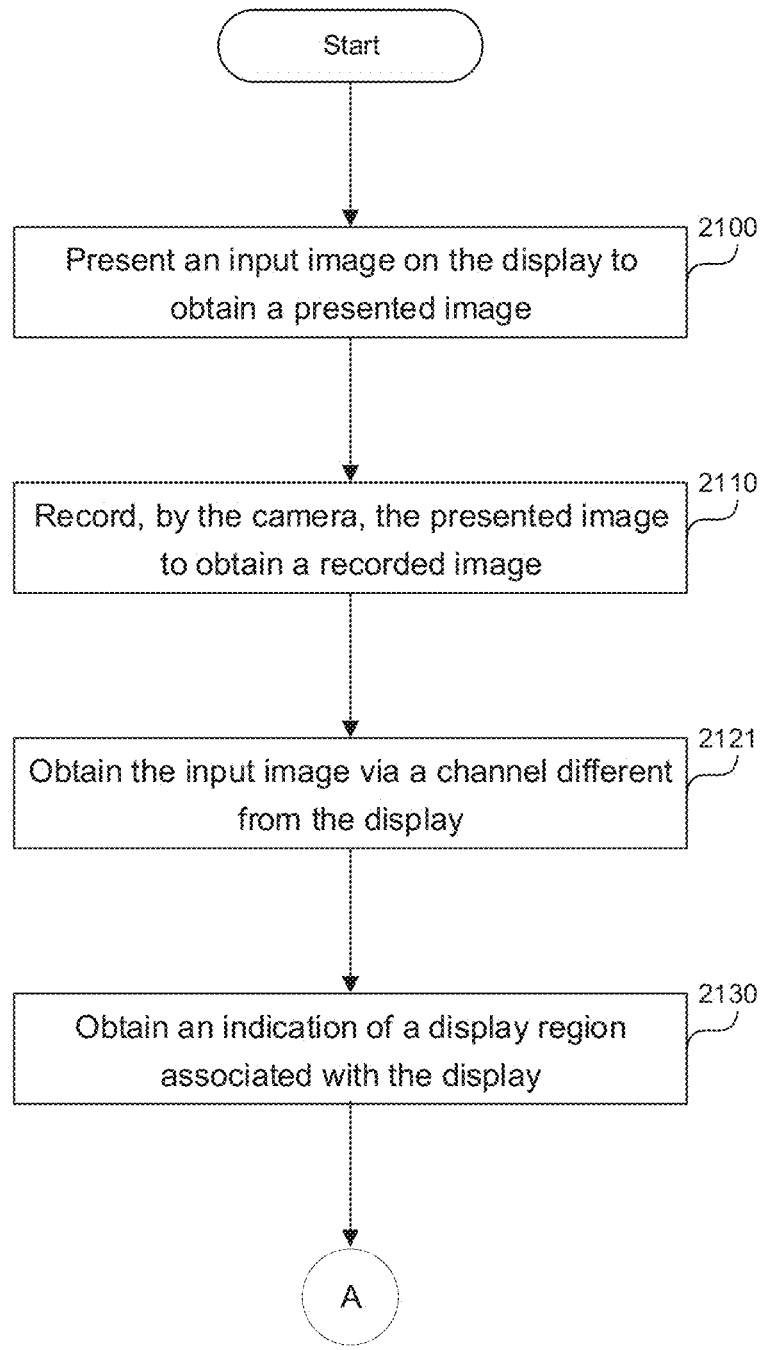
FIGS. 21A-21B show a flowchart of a method to calibrate an interaction between a display and a camera.
Figure 21B:
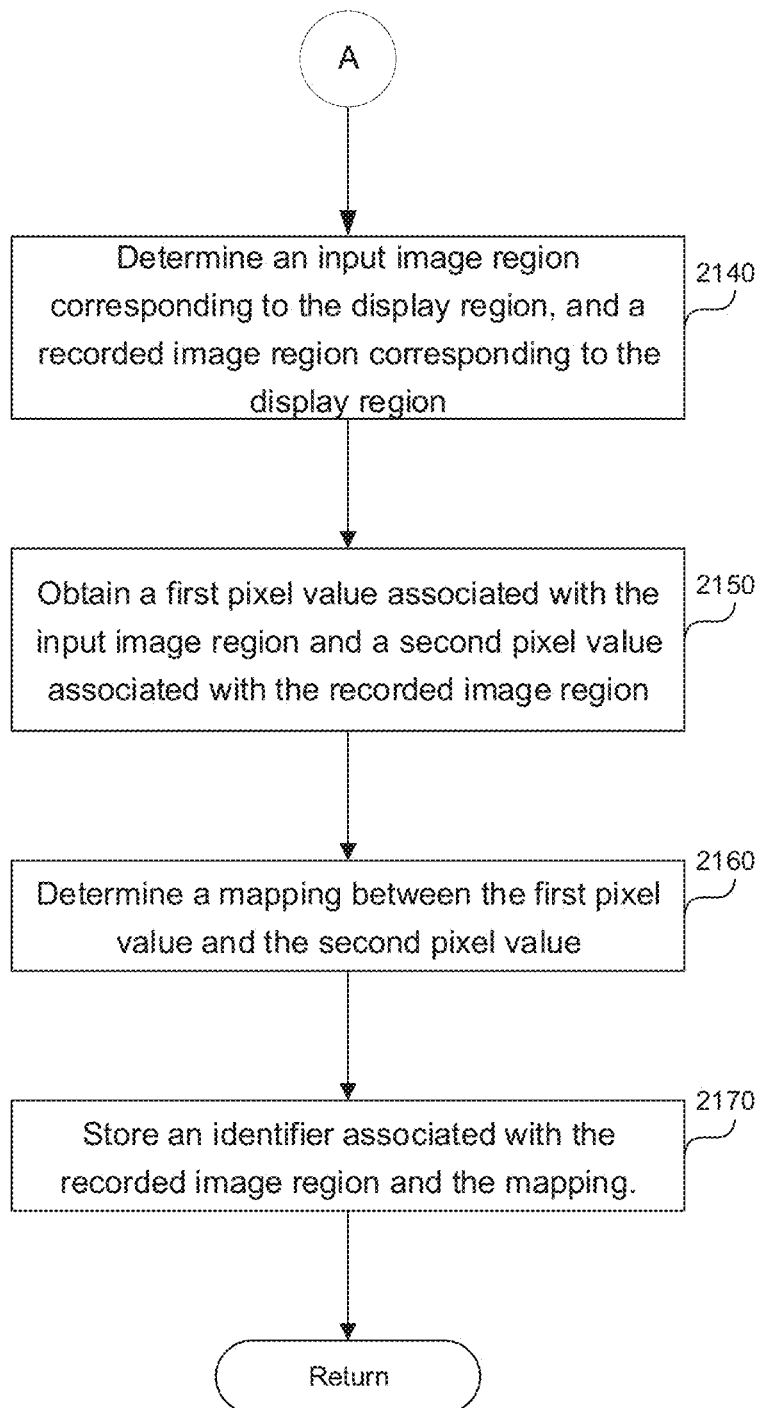

FIGS. 21A-21B show a flowchart of a method to calibrate an interaction between a display and a camera. In step 2100, a hardware or software processor executing instructions described in this application can present an input image on the display to obtain a presented image. In step 2110, the processor can record the presented image to obtain a recorded image. The camera can be calibrated or uncalibrated, and the camera can be arbitrarily positioned relative to the display. For example, the camera can be viewing the display at a non-perpendicular angle.

In step 2120, the processor can obtain the input image via a channel different from the display. The channel can be a wired or a wireless network. For example, the processor can receive the image presented on display through the network, or the processor can receive an indication of the image presented a display, such as a unique identifier. The processor can then use the unique identifier to retrieve the image presented on the display from a database.

In step 2130, the processor can obtain an indication of a display region associated with the display. The region can be a pixel or a collection of pixels such as an LED block associated with the virtual production display. The region can also include noncontiguous pixels. The indication of the display region can be a unique identifier of the display region, such as a location of the display region.

In step 2140, the processor can determine an input image region corresponding to the display region, and a recorded image region corresponding to the display region.

In step 2150, the processor can obtain a first pixel value associated with the input image region and a second pixel value associated with the recorded image region. A pixel value is a set of numbers defining hue, saturation and intensity. If the region is a pixel, the pixel value can represent a single pixel. If the region includes multiple pixels, the pixel value can be a group of pixel values representing each pixel in the region, or the pixel value can be an average of at least some of the pixels included in the region.

In step 2160, the processor can determine a mapping between the first pixel value and the second pixel value, where applying the mapping to the second pixel value substantially produces the first pixel value. Substantially producing the first pixel value can include matching the first pixel value to within 90%.

In step 1270, the processor can store an identifier associated with the recorded image region and the mapping.

The calibration process can aid in selecting an appropriate display region, such as an LED block to include in the virtual production display. For example, the processor can determine a color profile of the display region. The color profile can indicate a range of hue, saturation, and intensity that display region is capable of presenting. The processor can determine presented image region corresponding to the display region. The processor can obtain a third pixel value associated with the presented image region. The processor can determine a second mapping between the first pixel value and the third pixel value, where applying the second mapping to the third pixel value substantially produces the first pixel value. The second mapping indicates the color profile of the display region. The processor can obtain a desired mapping between the first pixel value and the third pixel value, where the desired mapping indicates a range of values associated with the third pixel value. The desired mapping can indicate the desired color profile of the display region. The processor can determine whether the desired mapping includes the second mapping. Upon determining the desired mapping does not include the second mapping, the display region can be adjusted. To adjust display region, the display region can be removed from the wall, adjusted to match the desired mapping, or put in a specific location on the wall based on the color profile of the display region.

The desired mapping can indicate the desired color profile of the display region. The desired color profile can vary based on location. For example, the processor can obtain a location of display region on the display. Based on the location, the processor can determine the desired mapping. In a more specific example, the desired mapping of a display region in the upper half of the display can indicate that the LED blocks placed in the upper half of the display need to have a high range in blue because the sky tends to be displayed in the upper half of the display. In another specific example, the desired color profile can indicate that LED blocks having a high dynamic range and capable of producing high intensity images should be placed in the upper half of the screen, where the sun and the sky tend to be displayed.

The desired color profile can vary based on the neighboring display regions. The color profiles of display regions should vary smoothly across the display. The processor can obtain a third mapping associated with a third presented image region neighboring the presented image region, where the third mapping indicates a color profile associated with the third presented image region. The processor can determine the desired mapping by computing the range of values based on the third mapping, where the desired mapping produces a smooth transition between the presented image region and the third presented image region.

The mapping between the input image and the recorded image can vary based on relative position and orientation between the display and the camera. The processor can obtain relative position and a relative orientation between the display and the camera. The processor can determine a correspondence indicating how the mapping varies based on the relative position and the relative orientation. The correspondence can be a lookup table or a mathematical function. The processor can store the identifier associated with the recorded image region, the mapping, and the correspondence.

The processor can modify the next image based on the results of the calibration. For example, the processor can record a second presented image presented on the display to obtain a second recorded image. The processor can retrieve the identifier associated with the recorded image region and the mapping. Based on the identifier, the processor can determine a second recorded image region associated with the second recorded image. The processor can apply the mapping to the second recorded image region to obtain an adjusted recorded image region. The processor can store the adjusted recorded image region.

Visual Content Generation System

Figure 22:
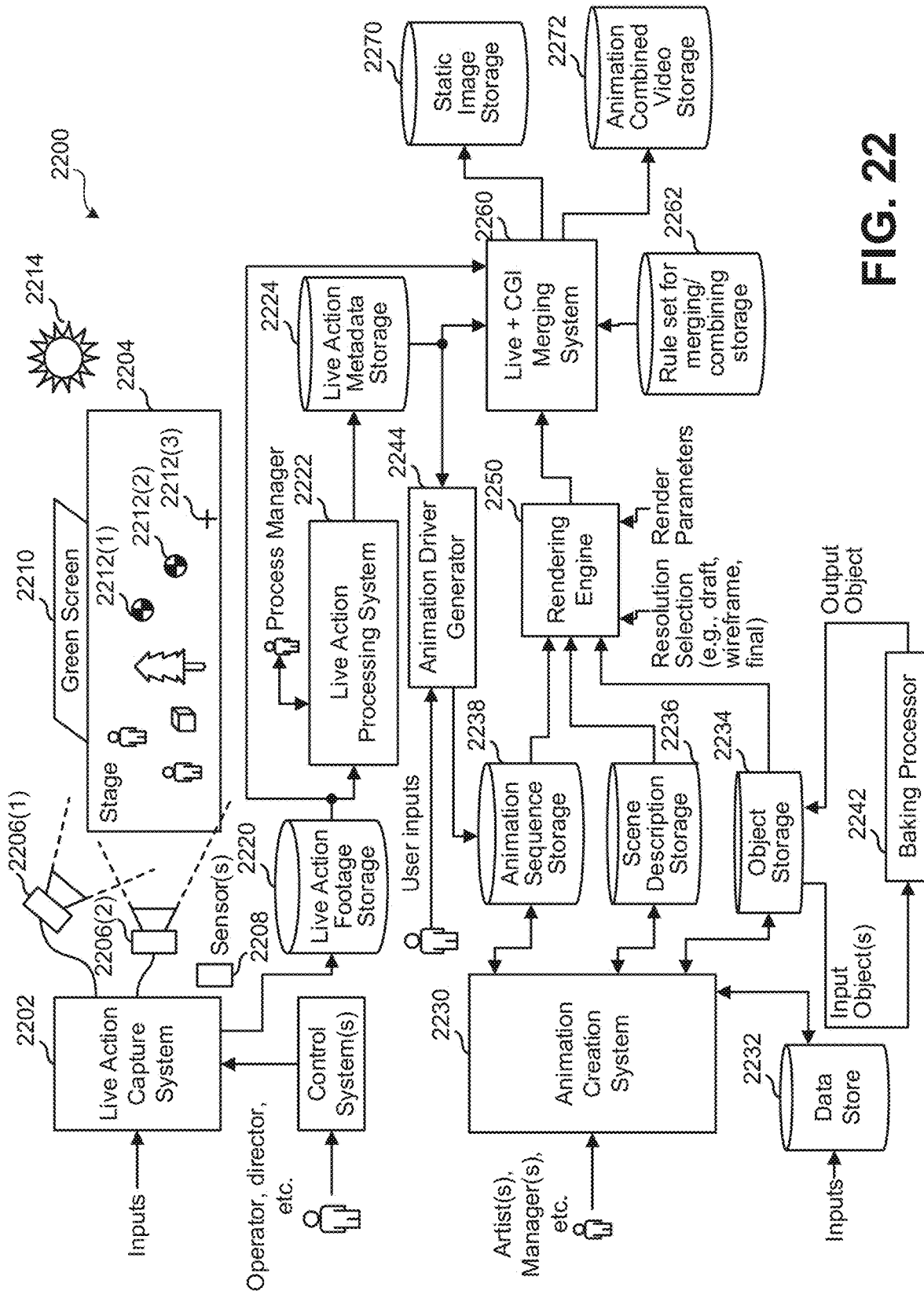
FIG. 22 illustrates an example visual content generation system as might be used to generate imagery in the form of still images and/or video sequences of images.

FIG. 22 illustrates an example visual content generation system 2200 as might be used to generate imagery in the form of still images and/or video sequences of images. Visual content generation system 2200 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 2200 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 2200 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 22, a live action capture system 2202 captures a live scene that plays out on a stage 2204. Live action capture system 2202 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 2206(1) and 2206(2) capture the scene, while in some systems, there might be other sensor(s) 2208 that capture information from the live scene (e.g., infrared cameras, infrared sensors, motion capture ("mo-cap") detectors, etc.). On stage 2204, there might be human actors, animal actors, inanimate objects, background objects, and possibly an object such as a green screen 2210 that is designed to be captured in a live scene recording in such a way that it is easily overlaid with computer-generated imagery. Stage 2204 might also contain objects that serve as fiducials, such as fiducials 2212(1)-(3), that might be used post-capture to determine where an object was during capture. A live action scene might be illuminated by one or more lights, such as an overhead light 2214.

During or following the capture of a live action scene, live action capture system 2202 might output live action footage to a live action footage storage 2220. A live action processing system 2222 might process live action footage to generate data about that live action footage and store that data into a live action metadata storage 2224. Live action processing system 2222 might include computer processing capabilities, image processing capabilities, one or more processors, program code storage for storing program instructions executable by the one or more processors, as well as user input devices and user output devices, not all of which are shown. Live action processing system 2222 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 2214, as that might be useful in post-processing to match computer-generated lighting on objects that are computer-generated and overlaid on the live action footage. Live action processing system 2222 might operate autonomously, perhaps based on predetermined program instructions, to generate and output the live action metadata upon receiving and inputting the live action footage. The live action footage can be camera-captured data as well as data from other sensors.

An animation creation system 2230 is another part of visual content generation system 2200. Animation creation system 2230 might include computer processing capabilities, image processing capabilities, one or more processors, program code storage for storing program instructions executable by the one or more processors, as well as user input devices and user output devices, not all of which are shown. Animation creation system 2230 might be used by animation artists, managers, and others to specify details, perhaps programmatically and/or interactively, of imagery to be generated. From user input and data from a database or other data source, indicated as a data store 2232, animation creation system 2230 might generate and output data representing objects (e.g., a horse, a human, a ball, a teapot, a cloud, a light source, a texture, etc.) to an object storage 2234, generate and output data representing a scene into a scene description storage 2236, and/or generate and output data representing animation sequences to an animation sequence storage 2238.

Scene data might indicate locations of objects and other visual elements, values of their parameters, lighting, camera location, camera view plane, and other details that a rendering engine 2250 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 2230 might be interactive, allowing a user to read in animation sequences, scene descriptions, object details, etc. and edit those, possibly returning them to storage to update or replace existing data. As an example, an operator might read in objects from object storage into a baking processor 2242 that would transform those objects into simpler forms and return those to object storage 2234 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 2232 might be used to drive object presentation. For example, if an artist is creating an animation of a spaceship passing over the surface of the Earth, instead of manually drawing or specifying a coastline, the artist might specify that animation creation system 2230 is to read data from data store 2232 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 2244 might read in live action metadata, such as data representing movements and positions of body parts of a live actor during a live action scene. Animation driver generator 2244 might generate corresponding animation parameters to be stored in animation sequence storage 2238 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 2222. Animation driver generator 2244 might convert that movement data into specifications of how joints of an articulated CGI character are to move over time.

A rendering engine 2250 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 2250 might include computer processing capabilities, image processing capabilities, one or more processors, program code storage for storing program instructions executable by the one or more processors, as well as user input devices and user output devices, not all of which are shown.

Visual content generation system 2200 can also include a merging system 2260 that merges live footage with animated content. The live footage might be obtained and input by reading from live action footage storage 2220 to obtain live action footage, by reading from live action metadata storage 2224 to obtain details such as presumed segmentation in captured images segmenting objects in a live action scene from their background (perhaps aided by the fact that green screen 2210 was part of the live action scene), and by obtaining CGI imagery from rendering engine 2250.

A merging system 2260 might also read data from rulesets for merging/combining storage 2262. A very simple example of a rule in a ruleset might be "obtain a full image including a two-dimensional pixel array from live footage, obtain a full image including a two-dimensional pixel array from rendering engine 2250, and output an image where each pixel is a corresponding pixel from rendering engine 2250 when the corresponding pixel in the live footage is a specific color of green, otherwise output a pixel value from the corresponding pixel in the live footage."

Merging system 2260 might include computer processing capabilities, image processing capabilities, one or more processors, program code storage for storing program instructions executable by the one or more processors, as well as user input devices and user output devices, not all of which are shown. Merging system 2260 might operate autonomously, following programming instructions, or might have a user interface or programmatic interface over which an operator can control a merging process. In some embodiments, an operator can specify parameter values to use in a merging process and/or might specify specific tweaks to be made to an output of merging system 2260, such as modifying boundaries of segmented objects, inserting blurs to smooth out imperfections, or adding other effects. Based on its inputs, merging system 2260 can output an image to be stored in a static image storage 2270 and/or a sequence of images in the form of video to be stored in an animated/combined video storage 2272.

Thus, as described, visual content generation system 2200 can be used to generate video that combines live action with computer-generated animation using various components and tools, some of which are described in more detail herein. While visual content generation system 2200 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Computer System

Figure 23:
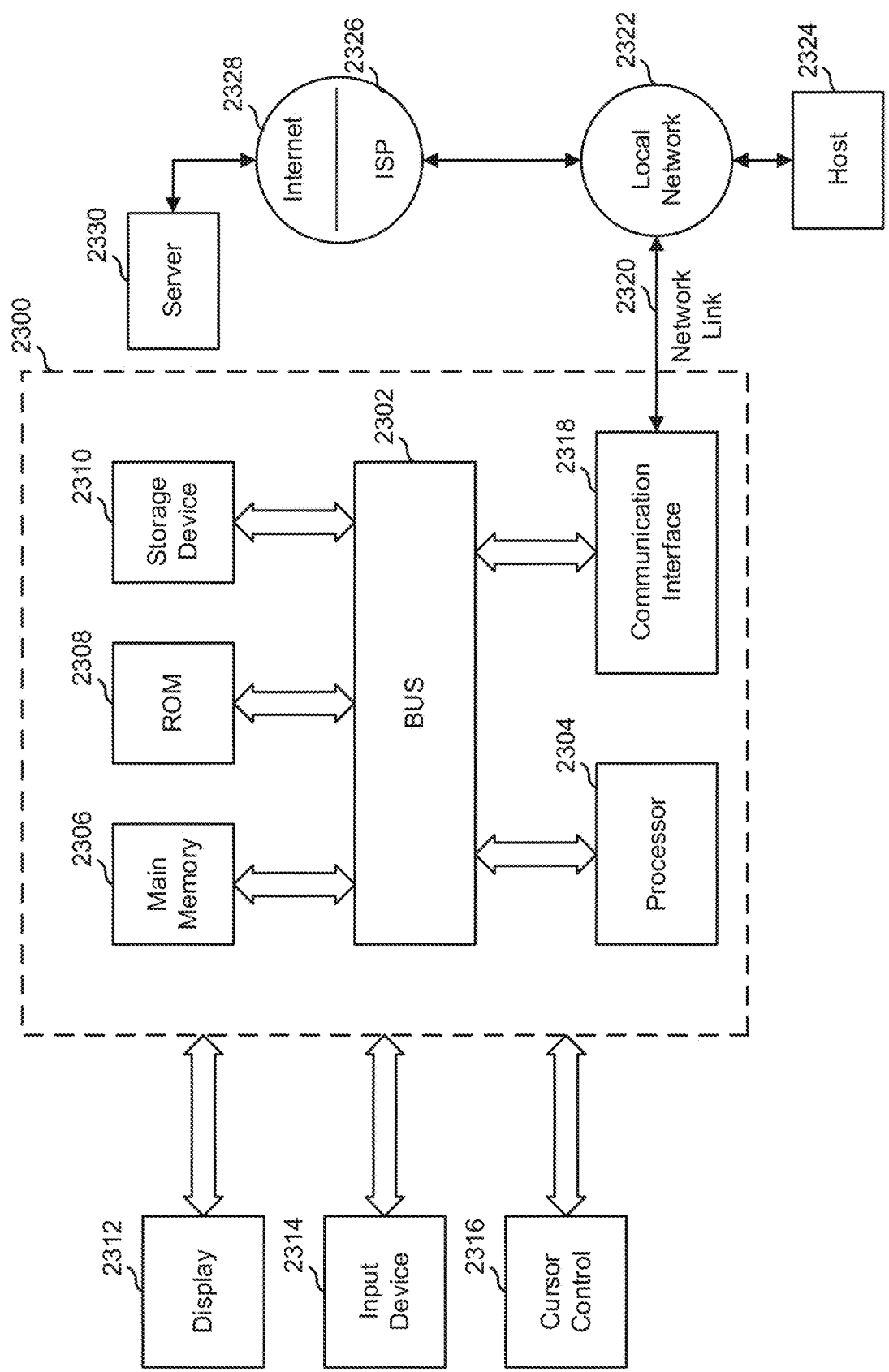
FIG. 23 is a block diagram that illustrates a computer system upon which the computer systems of the systems described herein and/or visual content generation system may be implemented.

FIG. 23 is a block diagram that illustrates a computer system 2300 upon which the computer systems of the systems described herein and/or visual content generation system 2200 (see FIG. 22) may be implemented. Computer system 2300 includes a bus 2302 or other communication mechanism for communicating information, and a processor 2304 coupled with bus 2302 for processing information. Processor 2304 may be, for example, a general-purpose microprocessor.

Computer system 2300 also includes a main memory 2306, such as a random-access memory (RAM) or other dynamic storage device, coupled to bus 2302 for storing information and instructions to be executed by processor 2304. Main memory 2306 may also be used for storing temporary variables or other intermediate information during execution of instructions to be executed by processor 2304. Such instructions, when stored in non-transitory storage media accessible to processor 2304, render computer system 2300 into a special-purpose machine that is customized to perform the operations specified in the instructions.

Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a computer monitor, for displaying information to a computer user. An input device 2314, including alphanumeric and other keys, is coupled to bus 2302 for communicating information and command selections to processor 2304. Another type of user input device is a cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

Computer system 2300 may implement the techniques described herein using customized hard-wired logic, one or more ASICs or FPGAs, firmware and/or program logic which in combination with the computer system causes or programs computer system 2300 to be a special-purpose machine. According to one embodiment, the techniques herein are performed by computer system 2300 in response to processor 2304 executing one or more sequences of one or more instructions contained in main memory 2306. Such instructions may be read into main memory 2306 from another storage medium, such as storage device 2310. Execution of the sequences of instructions contained in main memory 2306 causes processor 2304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 2310. Volatile media includes dynamic memory, such as main memory 2306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 2302. Transmission media can also take the form of acoustic or light waves, such as those generated during radio-wave and infra-red data communications.

Various forms of media may be involved in carrying one or more sequences of one or more instructions to processor 2304 for execution. For example, the instructions may initially be carried on a magnetic disk or solid-state drive of a remote computer. The remote computer can load the instructions into its dynamic memory and send the instructions over a network connection. A modem or network interface local to computer system 2300 can receive the data. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be a network card, a modem, a cable modem, or a satellite modem to provide a data communication connection to a corresponding type of telephone line or communications line. Wireless links may also be implemented. In any such implementation, communication interface 2318 sends and receives electrical, electromagnetic, or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world-wide packet data communication network now commonly referred to as the "Internet" 2328. Local network 2322 and Internet 2328 both use electrical, electromagnetic, or optical signals that carry digital data streams. The signals through the various networks and the signals on network link 2320 and through communication interface 2318, which carry the digital data to and from computer system 2300, are example forms of transmission media.

Computer system 2300 can send messages and receive data, including program code, through the network(s), network link 2320, and communication interface 2318. In the Internet example, a server 2330 might transmit a requested code for an application program through the Internet 2328, ISP 2326, local network 2322, and communication interface 2318. The received code may be executed by processor 2304 as it is received, and/or stored in storage device 2310, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network. A computer-readable medium may encompass both a non-transitory computer-readable storage medium and a transmission medium.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

REMARKS

The terms "example," "embodiment" and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. A system to increase dynamic range of an image recorded from a display comprising:
   at least one hardware processor; and
   at least one non-transitory memory storing instructions, which, when executed by the at least one hardware processor, cause the system to:
      obtain a splitting criterion used to divide an input image into a first image and a second image,
         wherein the splitting criterion indicates to split the input image according to luminance or according to a region;
      record, from the display, the first image by a camera to obtain a first recorded image, and the second image by the camera to obtain a second recorded image,
         wherein the camera is synchronized to the display to record the first recorded image when the display is showing the first image, and
         wherein the camera is synchronized to the display to record the second recorded image when the display is showing the second image;
      increase a luminance of the first recorded image to obtain a first recorded image with increased luminance; and
      increase the dynamic range of the image recorded from the display by combining the first recorded image with increased luminance and the second recorded image.

2. The system of claim 1, comprising instructions to:
   determine whether the splitting criterion indicates to split the input image according to luminance;
   upon determining that the splitting criterion indicates to split the input image according to luminance, determine an image having higher luminance between the first recorded image and the second recorded image; and
   increase a luminance of the image having higher luminance to obtain the first recorded image with increased luminance.

3. The system of claim 1, comprising instructions to:
   determine whether the splitting criterion indicates to split the input image according to the region; and
   upon determining that the splitting criterion indicates to split the input image according to the region, create the image recorded from the display by adding the first recorded image and the second recorded image.

4. The system of claim 1, the instructions to increase the luminance of the first recorded image comprising the instructions to:
   obtain a luminance of a region among multiple regions associated with the first image; and
   increase the luminance of the first recorded image by applying a function to the luminance of the region,
      wherein the function receives the luminance of the region as input, and produces an output increasing the luminance of the region.

5. The system of claim 4, wherein the function comprises a log encoding function, and/or a calibration function.

6. The system of claim 1, comprising the instructions to:
   obtain an input indicating a technique among multiple techniques,
      wherein the technique is configured to increase the dynamic range of the image recorded from the display; and
   apply at least a portion of the technique to the first image recorded from the display.

7. The system of claim 1, comprising the instructions to:
   determine a region in the first recorded image and the second recorded image corresponding to a source of light external to the display; and
   ensure the region is not combined twice when combining the first recorded image and the second recorded image.

8. At least one non-transitory computer-readable storage medium and carrying instructions, which, when executed by at least one data processor of a system, causes the system to:
   obtain a splitting criterion used to divide an input image into a first image and a second image,
      wherein the splitting criterion indicates to split the input image according to luminance or according to region;
   record, from a display, the first image by a camera to obtain a first recorded image, and the second image by the camera to obtain a second recorded image,
      wherein the camera is synchronized to the display to record the first recorded image when the display is showing the first image, and
      wherein the camera is synchronized to the display to record the second recorded image when the display is showing the second image;
   increase a luminance of the first recorded image to obtain a first recorded image with increased luminance; and
   increase dynamic range of an image recorded from the display by combining the first recorded image with increased luminance and the second recorded image.

9. The non-transitory computer-readable storage medium of claim 8, comprising instructions to:
   determine whether the splitting criterion indicates to split the input image according to luminance;
   upon determining that the splitting criterion indicates to split the input image according to luminance, determine an image having higher luminance between the first recorded image and the second recorded image; and
   increase a luminance of the image having higher luminance to obtain the first recorded image with increased luminance.

10. The non-transitory computer-readable storage medium of claim 8, comprising instructions to:
    determine whether the splitting criterion indicates to split the input image according to the region; and
    upon determining that the splitting criterion indicates to split the input image according to the region, create the image recorded from the display by adding the first recorded image and the second recorded image.

11. The non-transitory computer-readable storage medium of claim 8, the instructions to increase the luminance of the first recorded image comprising the instructions to:
    obtain a luminance of a region among multiple regions associated with the first image; and
    increase the luminance of the first recorded image by applying a function to the luminance of the region,
       wherein the function receives the luminance of the region as input, and produces an output increasing the luminance of the region.

12. The non-transitory computer-readable storage medium of claim 11, wherein the function comprises a log encoding function, and/or a calibration function.

13. The non-transitory computer-readable storage medium of claim 8, comprising the instructions to:
obtain an input indicating a technique among multiple techniques,
wherein the technique is configured to increase the dynamic range of the image recorded from the display; and
apply at least a portion of the technique to the first image recorded from the display.

14. The non-transitory computer-readable storage medium of claim 8, comprising the instructions to:
determine a region in the first recorded image and the second recorded image corresponding to a source of light external to the display; and
ensure the region is not combined twice when combining the first recorded image and the second recorded image.

15. A method comprising:
obtaining a splitting criterion used to divide an input image into a first image and a second image,
wherein the splitting criterion indicates to split the input image according to luminance or according to region;
recording, from a display, the first image by a camera to obtain a first recorded image, and the second image by the camera to obtain a second recorded image,
wherein the camera is synchronized to the display to record the first recorded image when the display is showing the first image, and
wherein the camera is synchronized to the display to record the second recorded image when the display is showing the second image;
increasing a luminance of the first recorded image to obtain a first recorded image with increased luminance; and
increasing dynamic range of an image recorded from the display by combining the first recorded image with increased luminance and the second recorded image.

16. The method of claim 15, comprising:
determining whether the splitting criterion indicates to split the input image according to luminance;
upon determining that the splitting criterion indicates to split the input image according to luminance, determining an image having higher luminance between the first recorded image and the second recorded image; and
increasing a luminance of the image having higher luminance to obtain the first recorded image with increased luminance.

17. The method of claim 15, comprising:
determining whether the splitting criterion indicates to split the input image according to the region; and
upon determining that the splitting criterion indicates to split the input image according to the region, creating the image recorded from the display by adding the first recorded image and the second recorded image.

18. The method of claim 15, wherein increasing the luminance of the first recorded image comprises:
obtaining a luminance of a region among multiple regions associated with the first image; and
increasing the luminance of the first recorded image by applying a function to the luminance of the region,
wherein the function receives the luminance of the region as input, and produces an output increasing the luminance of the region.

19. The method of claim 18, wherein the function comprises a log encoding function, and/or a calibration function.

20. The method of claim 15, comprising:
obtaining an input indicating a technique among multiple techniques,
wherein the technique is configured to increase the dynamic range of the image recorded from the display; and
applying at least a portion of the technique to the first image recorded from the display.

21. The method of claim 15, comprising:
determining a region in the first recorded image and the second recorded image corresponding to a source of light external to the display; and
ensuring the region is not combined twice when combining the first recorded image and the second recorded image.

* * * * *